(12) United States Patent
Tsai

(10) Patent No.: US 12,543,804 B2
(45) Date of Patent: Feb. 10, 2026

(54) CUSHION AIRBAG PAD

(71) Applicant: Dongguan Jiashuan Industrial Co., Ltd., Guangdong (CN)

(72) Inventor: Pei-Lin Tsai, Guangdong (CN)

(73) Assignee: Dongguan Jiashuan Industrial Co., Ltd., Guangdong (CN)

( * ) Notice: Subject to any disclaimer, the term of this patent is extended or adjusted under 35 U.S.C. 154(b) by 0 days.

(21) Appl. No.: 19/027,636

(22) Filed: Jan. 17, 2025

(65) Prior Publication Data

US 2025/0194712 A1    Jun. 19, 2025

Related U.S. Application Data

(63) Continuation-in-part of application No. PCT/CN2023/142711, filed on Dec. 28, 2023.

(30) Foreign Application Priority Data

Dec. 16, 2023   (CN) .......................... 202311745936.2
Dec. 16, 2023   (CN) .......................... 202323456912.3

(51) Int. Cl.
*A41D 13/015*      (2006.01)
*A45F 3/00*        (2006.01)
(Continued)

(52) U.S. Cl.
CPC .......... *A41D 13/0155* (2013.01); *A45F 3/12* (2013.01); *A47C 27/084* (2013.01);
(Continued)

(58) Field of Classification Search
CPC ..... A47C 27/08; A47C 27/081; A47C 27/084; A47C 27/10; F16F 9/049; F16F 9/64; F16F 9/34; F16K 15/20
See application file for complete search history.

(56) References Cited

U.S. PATENT DOCUMENTS

| | | | | |
|---|---|---|---|---|
| 3,133,696 A | * | 5/1964 | Mirando | A47C 27/081 92/92 |
| 3,155,991 A | * | 11/1964 | Dunham | A47C 27/084 5/709 |

(Continued)

FOREIGN PATENT DOCUMENTS

| | | | |
|---|---|---|---|
| CN | 1093250 A | | 10/1994 |
| CN | 201480736 U | * | 5/2010 |

(Continued)

*Primary Examiner* — Eric J Kurilla
(74) *Attorney, Agent, or Firm* — ScienBiziP, P.C.

(57) ABSTRACT

A cushion airbag pad, which comprises: a cushion body, comprising a pad body; a plurality of airbags; and a plurality of airways; and a one-way air admittance member mounted in the cushion body and internally provided with a one-way air admittance channel; wherein the one-way air admittance channel is provided with an air inlet port and at least one air outlet port, and at least two ends of the one-way air admittance member are fixed to the cushion body, and one end of the at least two ends, away from the air inlet port, of the one-way air admittance member is fixed to the pad body, such that warping of the one-way air admittance member is inhibited, thereby keeping the one-way air admittance member in a non-bending state.

17 Claims, 19 Drawing Sheets

(51) Int. Cl.
*A45F 3/12* (2006.01)
*A47C 7/14* (2006.01)
*A47C 7/40* (2006.01)
*A47C 27/08* (2006.01)

(52) U.S. Cl.
CPC ......... *A45F 2003/001* (2013.01); *A47C 7/142* (2018.08); *A47C 7/40* (2013.01); *A47C 27/081* (2013.01); *A47C 27/088* (2013.01)

(56) References Cited

U.S. PATENT DOCUMENTS

| | | | | |
|---|---|---|---|---|
| 4,966,197 | A | * | 10/1990 | Jaron .................... F16K 15/147 137/846 |
| 5,144,708 | A | * | 9/1992 | Pekar ................... A47C 27/084 137/846 |
| 5,145,338 | A | * | 9/1992 | Murray .................. F04B 43/08 92/92 |
| 5,372,487 | A | * | 12/1994 | Pekar .................... F16K 15/147 137/846 |
| 5,558,441 | A | * | 9/1996 | Morrison ............... B65D 33/01 383/44 |
| 6,019,122 | A | * | 2/2000 | Chen .................... F16K 15/202 137/846 |
| 6,170,513 | B1 | * | 1/2001 | Lo ........................ F16K 15/147 446/224 |
| 6,402,190 | B1 | * | 6/2002 | Heudorfer ............. B60R 21/233 137/846 |
| 7,146,665 | B1 | * | 12/2006 | Moorin .................. A47C 7/383 5/639 |
| 7,412,738 | B2 | * | 8/2008 | Chaffee ................ A47C 20/027 5/655.3 |
| 2005/0125905 | A1 | * | 6/2005 | Wilkinson ......... A61G 7/05776 5/709 |
| 2018/0017177 | A1 | * | 1/2018 | Marson .................. A47C 27/10 |

FOREIGN PATENT DOCUMENTS

| | | | | | |
|---|---|---|---|---|---|
| CN | 201821935 | U | | 5/2011 | |
| CN | 102425689 | A | * | 4/2012 | |
| CN | 102726989 | A | * | 10/2012 | |
| CN | 213621344 | U | | 7/2021 | |
| CN | 113712341 | A | * | 11/2021 | |
| CN | 114041942 | A | * | 2/2022 | ........... A43B 17/035 |
| CN | 217566607 | U | * | 10/2022 | ............. A61G 13/10 |
| CN | 217886418 | U | * | 11/2022 | ........... A43B 17/035 |
| CN | 217886419 | U | * | 11/2022 | ........... A43B 17/035 |
| CN | 218816827 | U | * | 4/2023 | ........... A47C 27/081 |
| DE | 4413445 | A1 | * | 10/1995 | ........... A47C 27/081 |
| TW | M254938 | U | * | 1/2005 | |
| TW | M290815 | U | * | 5/2006 | |
| TW | I787015 | B | * | 12/2022 | |
| WO | WO-9403089 | A1 | * | 2/1994 | ........... A47C 27/081 |

* cited by examiner

CUSHION AIRBAG PAD

CROSS-REFERENCE

This application is a continuation-in-part of International Patent Application Ser. No. PCT/CN2023/142711 filed Dec. 28, 2023, which is incorporated herein by reference in its entirety. Additionally, this invention claims the benefit of priorities from the following patent applications filed in China: Chinese Patent Application Ser. No. CN 202323456912.3, filed on Dec. 16, 2023, and Chinese Patent Application Ser. No. CN 202311745936.2, which was filed on Dec. 16, 2023.

TECHNICAL FIELD

The present invention belongs to the field of living appliances, in particular to a cushion airbag pad.

BACKGROUND ART

As an appliance providing buffering pressure, airbag cushions are widely used in a variety of products, for example, such buffering cushions as bag shoulder straps, seat cushions, back cushions, mattresses, and shoe insoles can buffer the pressure on contact sites of users.

However, as to the existing airbag cushion, after gas enters an airbag of the airbag cushion, a part of the gas will slowly leak to the outside through an air inlet port, therefore, slow air leakage occurs to the whole airbag cushion, then after the cushion is used by users for a certain period of time, gas inside the airbag is insufficient, then air inflation is required again, thereby leading to inconvenience in use.

The existing one-way air admittance member is provided with an air inlet portion and an air outlet portion, wherein the air inlet portion is configured to receive gas from a ventilated airway of a first airbag, the air outlet portion is communicated to the air inlet portion and the second airbag, and the air outlet portion is suspended inside the second airbag and is in a closed state in an unvented state to prevent gas inside the second airbag from flowing back to the first airbag. However, the inventor has found that in the step of attaching the one-way air admittance member to an upper cushion body and a lower cushion body, the air outlet portion of the one-way air admittance member is easily deformed and bent, then the air outlet portion droops and bends relative to the air inlet portion, such that when the airbag cushion is inflated, gas cannot smoothly enter the bent air outlet portion after entering the air inlet portion, thereby resulting in a failure in inflation, and leading to inconvenience in use.

SUMMARY OF THE INVENTION

The solution of the present invention provides a cushion airbag pad which is smoothly inflated and convenient to use.

In one aspect, embodiments of the disclosure provide a cushion airbag pad, which comprises: a cushion body, comprising a pad body; a plurality of airbags; and a plurality of airways, wherein the plurality of airbags and the plurality of airways are formed on the pad body, the plurality of airbags are communicated through the plurality of airways, and the pad body isolates the plurality of airbags and the plurality of airways from the outside; and a one-way air admittance member mounted in the cushion body and internally provided with a one-way air admittance channel; wherein the one-way air admittance channel is provided with an air inlet port and at least one air outlet port which are intercommunicated with each other, the one-way air admittance channel allows gas to flow unidirectionally from the air inlet port to the at least one air outlet port, thereby permitting gas to unidirectionally enter the plurality of airbags and the plurality of airways of the cushion body and preventing leakage of gas to the outside of the cushion body, and at least two ends of the one-way air admittance member are fixed to the cushion body, and one end of the at least two ends, away from the air inlet port, of the one-way air admittance member is fixed to the pad body, such that warping of the one-way air admittance member is inhibited, thereby keeping the one-way air admittance member in a non-bending state.

In another aspect, embodiments of the disclosure further provide a A cushion airbag pad, which comprises: a cushion body, comprising a pad body; a plurality of airbags; and a plurality of airways, wherein the plurality of airbags and the plurality of airways are formed on the pad body, the plurality of airbags are communicated through the plurality of airways, the pad body isolates the plurality of airbags and the plurality of airways from the outside; and a one-way air admittance member mounted in the cushion body to allow gas to unidirectionally enter the plurality of airbags and the plurality of airways of the cushion body and to prevent gas from leaking to the outside of the cushion body, wherein the one-way air admittance channel is provided with an air inlet port and at least one air outlet port which are intercommunicated with each other, the one-way air admittance member is further provided with a junction portion, the junction portion is connected to at least two adjacent air outlet ports, the one-way air admittance member allows gas to flow unidirectionally from the air inlet port to the at least one air outlet port and to flow out of the at least one air outlet port while bypassing the junction portion.

In the present application, through such a one-way air admittance member and the cushion airbag pad, slow leakage of gas can be prevented, and air leakage of the cushion airbag pad is effectively prevented, and further frequent inflation is not required, thereby facilitating use, inhibiting a failure in favorable gas flow due to a curled one-way air admittance member, and prolonging the service life.

DETAILED DESCRIPTION

Figure 1:
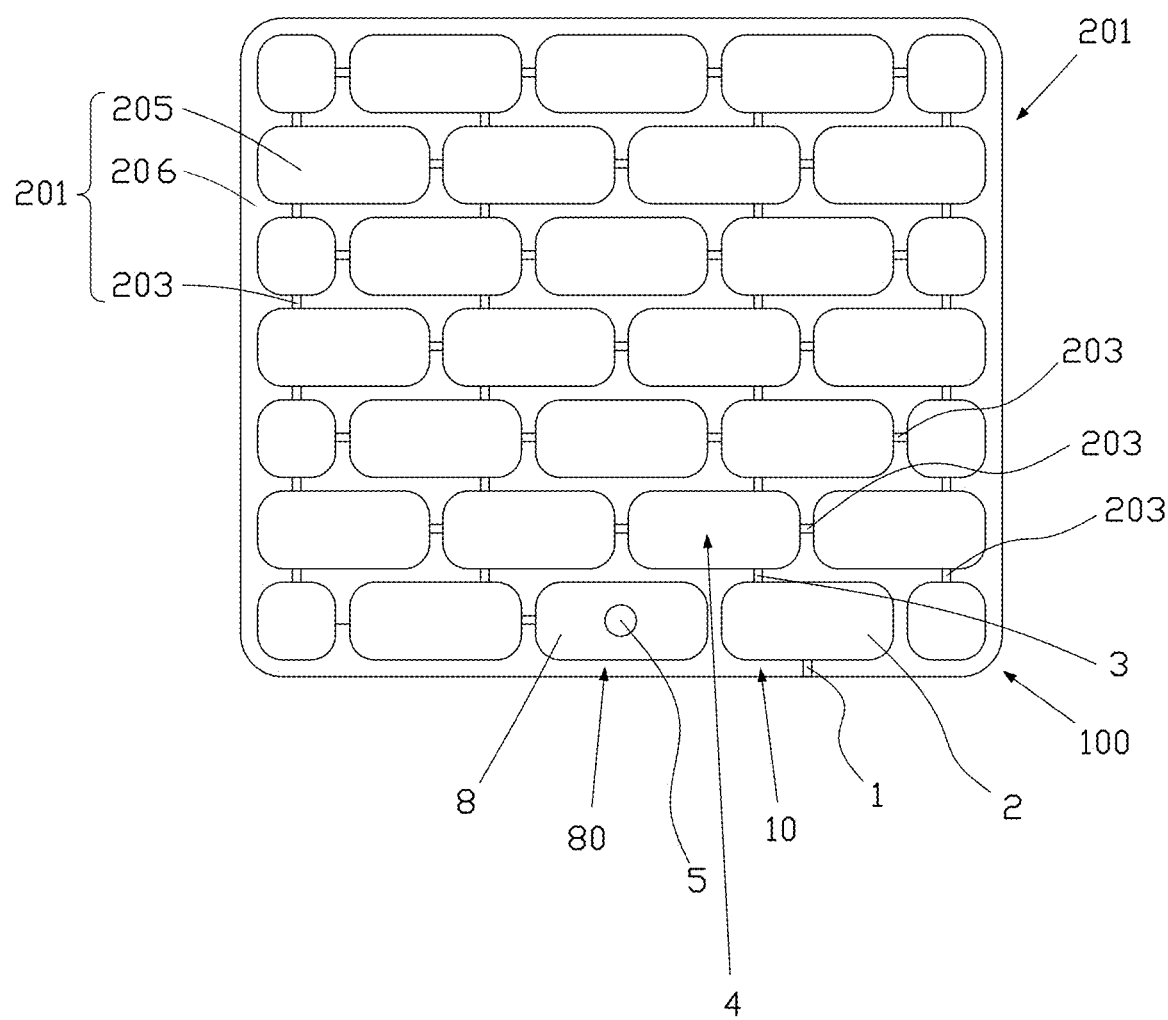
FIG. 1 is a schematic diagram of a top view of a cushion airbag pad according to the present invention.
Figure 2:
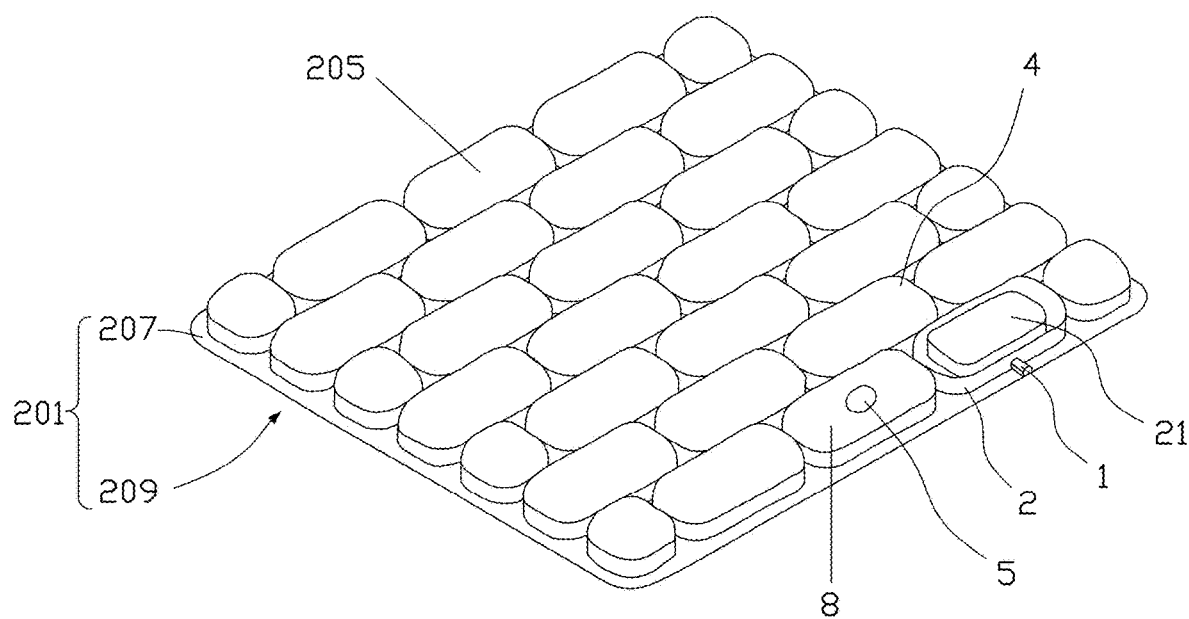
FIG. 2 is a three-dimensional schematic diagram of a cushion airbag pad according to the present invention.

FIG. 1 and FIG. 2 show a cushion airbag pad 200 involved in the present invention, and the cushion airbag pad 200 includes a cushion body 201 and an airbag auxiliary component 100 arranged in the cushion body 201.

The cushion body 201 includes a pad body 206 formed on a plane and a plurality of airways 203 and a plurality of airbags 205 communicated through the plurality of airways 203. The plurality of airways 203 and the plurality of airbags 205 are formed on the pad body 206. the pad body isolates the plurality of airbags and the plurality of airways from the outside. The airbag auxiliary component 100 is communicated with the plurality of airbags 205 to control air inlet and air outlet of the plurality of airbags 205. The plurality of airways 203 and the plurality of airbags 205 are bulged.

In the present embodiment, the cushion body 201 further includes an upper cushion body 207 and a lower cushion body 209, wherein the upper cushion body 207 is formed with a plurality of airways 203 and a plurality of airbags 205 distributed in stipulated shapes, the lower cushion body 209 is joined to the portion, not formed with the plurality of airways 203 and the plurality of airbags 205, of the upper cushion body 207, such that the plurality of airways 203 and the plurality of airbags 205 are formed by attaching and sealing the upper cushion body 207 and lower cushion body 209.

The airbag auxiliary component 100 includes an air inlet assembly 10 and an air outlet assembly 80. The air inlet assembly 10 is configured to unidirectionally inflate external gas into the plurality of airbags 205, and the air outlet assembly 80 is configured to discharge gas from the plurality of airbags 205 to the outside. The air inlet assembly 10 is communicated with adjacent airbags 205 in the plurality of airbags 205 through at least one ventilated airway 203, with a function of pressing gas into the plurality of airbags 205 of the cushion body 201 from the outside. The air outlet assembly 80 is communicated with the adjacent airbags 205 respectively through at least one ventilated airway 203, with a function of releasing gas from the plurality of airbags 205 of the cushion body 201. The air inlet assembly 10 is not directly communicated with the air outlet assembly 80, but rather is connected and communicated with the air outlet assembly 80 through connecting in series with the plurality of airbags 205 and the plurality of airways 203.

Continue referring to FIG. 1 and FIG. 2, and the specific composition of the airbag auxiliary component 100 is described in detail.

The air inlet assembly 10 is provided with an air inlet port 1, an air inlet airbag 2, an air inlet airway 3, a gas diffusion airbag 4, and a one-way air admittance member 6. The air inlet airbag 2, the gas diffusion airbag 4, and the air inlet airway 3 are bulged.

The air inlet airbag 2 allows external gas to enter the plurality of airbags 205. An air inlet port 1 is formed on one side of the air inlet airbag 2, the air inlet port 1 is communicated to the outside, an air inlet airway 3 is arranged on the other side, communicated with the gas diffusion airbag 4, of the air inlet airbag 2, such that the air inlet airbag 2 is communicated with the gas diffusion airbag 4, and further the air inlet airway 3 is communicated with the air inlet port 1. The air inlet airbag 2 may contain an elastomer 21 and an air inlet valve (not shown in the figures). The elastomer 21 supports the air inlet airbag 2 to bulge in a natural state, such that gas enters and fills the air inlet airbag 2 via the air inlet port 1. When the air inlet airbag 2 is pressed, the air inlet valve is a check valve, thereby preventing gas from leaking outwards, and at this time, under the effect of a difference in air pressure, gas inside the air inlet airbag 2 enters the gas diffusion airbag 4 via the air inlet airway 3, and then the air inlet airbag 2 is released, and under the elastic resetting effect of the elastomer 21, the elastomer 21 supports the air inlet airbag 2 to reset, at this time, under the effect of a difference in air pressure, when gas is sucked into the air inlet airbag 2 via the air inlet port 1, the one-way air admittance member 6 prevents gas in the gas diffusion airbag 4 from being sucked into the air inlet airbag 2. By repeatedly pressing and releasing the air inlet airbag 2, the cushion body 201 can be inflated. It can be understood that the elastomer 21 can be any one of a sponge body, a plastic body, a spring, a rubber, a silicone, as long as it is an elastic component. Furthermore, an air inlet valve can also be replaced, and any composition can be available as long as gas in the air inlet airbag 2 does not leak outside. Further, the elastomer 21 can also be replaced, and any composition can be available as long as gas can be supplied to the air inlet airbag 2.

The gas diffusion airbag 4 is configured to diffuse gas in the gas diffusion airbag 4 to a plurality of other airbags 205, and the gas diffusion airbag 4 is communicated with the air inlet airbag 2 via the air inlet airway 3 as described above, and is respectively communicated to the adjacent airbags 205 via the at least one ventilated airway 203.

The one-way air admittance member 6 is sandwiched between the upper cushion body 207 and the lower cushion body 209 of the cushion airbag pad 200, and is arranged across the gas diffusion airbag 4 to provide a one-way air admittance channel 60 from the air inlet airbag 2 towards the gas diffusion airbag 4. Two opposite ends of the one-way air admittance member 6 are mounted to the gas diffusion airbag 4. In the present embodiment, one end of the one-way air admittance member 6 is mounted at a position at which the air inlet airbag 2 is connected to the gas diffusion airbag 4 (i.e., the air inlet airway 3), and the other end is mounted to a peripheral edge, opposite to the air inlet airbag 2, of the gas diffusion airbag 4 (i.e., the position at which the gas diffusion airbag 4 is connected to the adjacent and communicated airbags 205).

Figure 3:
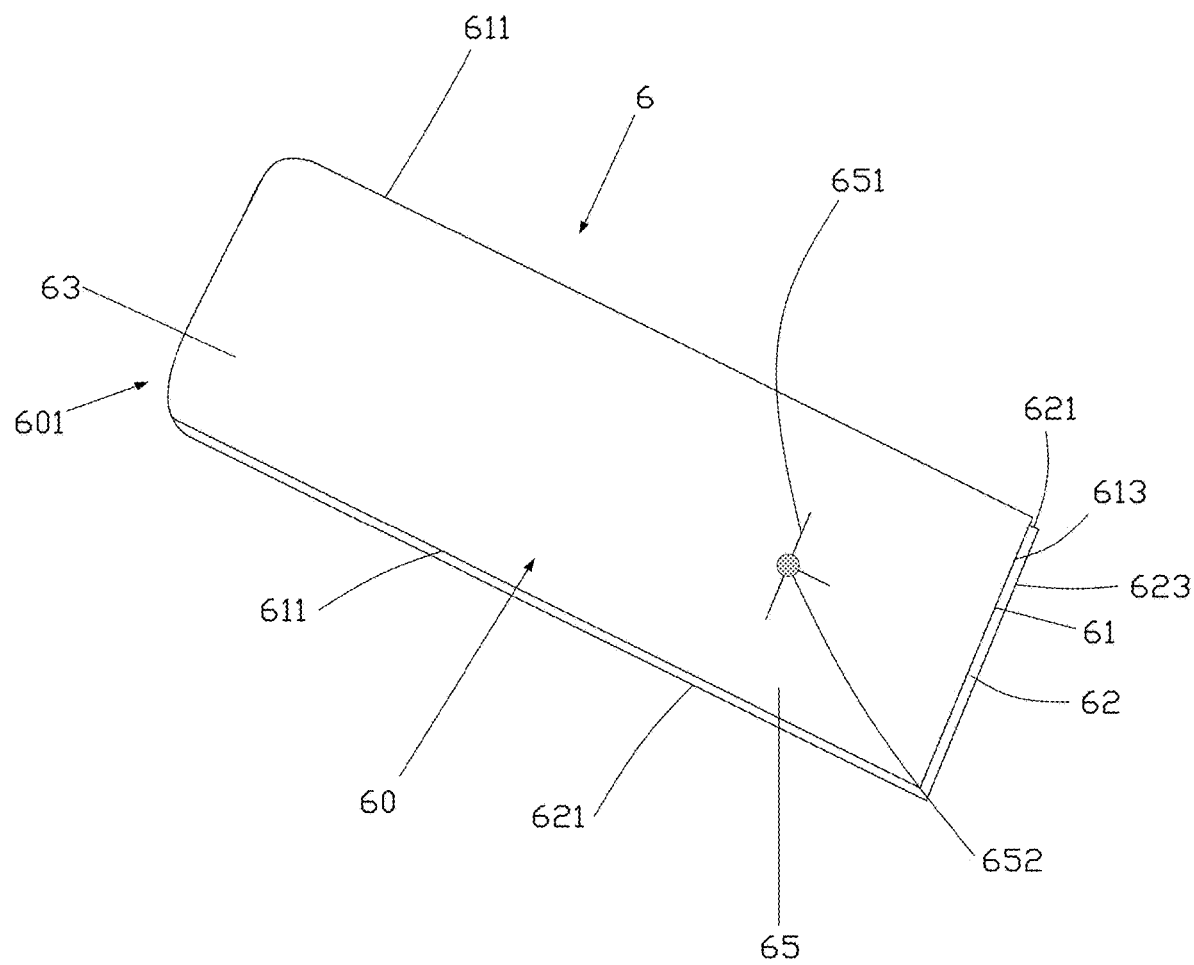
FIG. 3 is a schematic diagram of an example of a one-way air admittance member according to the present invention.
Figure 4:
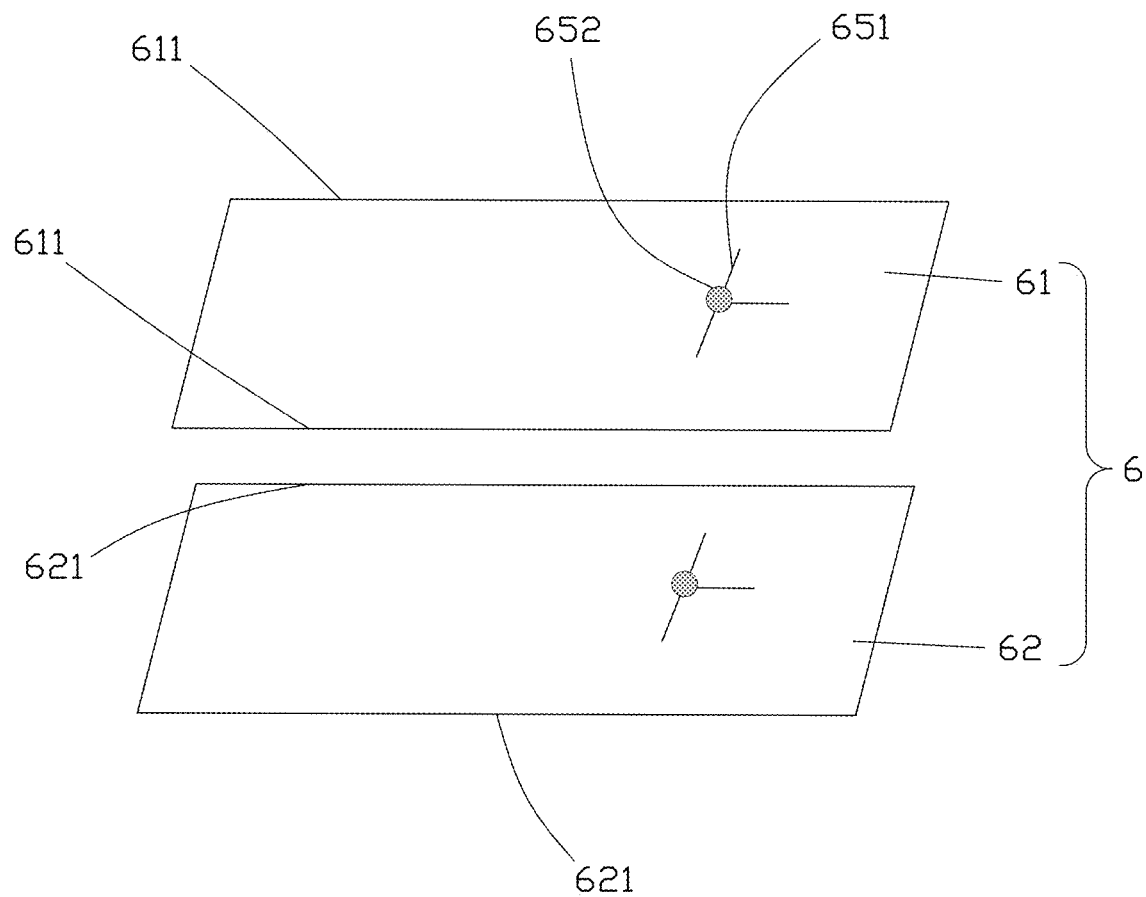
FIG. 4 is an exploded view of a one-way air admittance member according to the present invention.

As shown in FIG. 3 and FIG. 4, the one-way air admittance member 6 consists of two soft and flat films (e.g., plastic sheets), i.e., an upper sheet 61 and a lower sheet 62, and a one-way air admittance channel 60 is formed between the film-like upper sheet 61 and the film-like lower sheet 62. The upper sheet 61 and the lower sheet 62 are made of, for example, polyether-type TPUs and polyester-type TPUs (thermoplastic polyurethanes) or PVC, EVA and other plastic sheet materials. The upper sheet 61 and the lower sheet 62 may be made of the same material or may be made of different materials.

The structure of the one-way air admittance member 6 is for example as shown in FIG. 3, wherein two side edges 611 of the upper sheet 61 and the opposite two side edges 621 of the lower sheet 62, as well as the side edge 613 of the upper sheet 61 and the opposite side edge 623 of the lower sheet 62 are for example joined through high-frequency welding, such that the one-way air admittance member 6 is formed into a structure in which three sides are closed and one side is formed with an opening 601 and the opening 601 is communicated with the inside. Since the upper sheet 61 and the lower sheet 62 are soft and flat, and in particular the inner walls of the upper sheet 61 and the lower sheet 62 in contact with each other are smooth, therefore, the upper sheet 61 and the lower sheet 62 can be adsorbed to each other when they are in contact with each other, and can play a role of closing the one-way air admittance channel 60. Here, "adsorbed to each other" means that the upper sheet 61 and the lower sheet 62 adhere to each other due to electrostatic adhesion. Moreover, the air pressure difference can be generated between the upper and lower sheets and the one-way air admittance member 6 (that is, near the air inlet portion 63). Under the effect of the air pressure difference, the upper sheet 61 and the lower sheet 62 can be separated, and the one-way air admittance channel 60 can be opened.

The one-way air admittance member 6 is a pocket-like structure, with one side open and the remaining sides sealed. The one open side of the one-way air admittance member 6 is formed with an opening 601 and the opening 601 is communicated with the inside, a one-way air admittance channel 60 is formed inside the one-way air admittance member 6. An end, communicated with the opening 601, of the one-way air admittance channel 60 is provided with an air inlet portion 63, and an end, away from the opening 601, of the one-way air admittance channel 60 is provided with a fixing portion 67, and an air outlet portion 65 is formed between the air inlet portion 63 and the fixing portion 67. The opening 601 of the air inlet portion 63 is communicated with the air inlet airbag 2 and the air inlet port 1. An air outlet port 651 is formed to penetrate through the air outlet portion 65, and the air outlet port 651 is communicated with the gas diffusion airbag 4 and is communicated with the opening 601 in the one-way air admittance channel 60. When the one-way air admittance channel 60 is open, the upper sheet 61 and the lower sheet 62 of the air inlet portion 63 and the air outlet portion 65 are separated and the air inlet portion 63 and the air outlet portion 65 are communicated, such that the opening 601 is communicated with the air outlet port 651; on the other hand, when the one-way air admittance channel 60 is closed, the upper sheet 61 and the lower sheet 62 of the air inlet portion 63 and the air outlet portion 65 are adsorbed against each other and are not communicated, such that the opening 601 is not communicated with the air outlet port 651.

The air inlet portion 63 is arranged at least in the air inlet airway 3 and is always in an open state. It can be understood that the air inlet portion 63 may also be in a closed state, and may be designed according to actual needs.

The air inlet portion 63 is mounted at a position at which the air inlet airbag 2 is connected to the gas diffusion airbag 4 (i.e., the position of the air inlet airway 3), and the opening 601 is open towards the air inlet airbag 2 and is communicated with the air inlet airbag 2.

The fixing portion 67 is mounted on a peripheral edge, opposite to the air inlet airbag 2, of the gas diffusion airbag 4, i.e., the peripheral edge away from the air inlet airbag 2. In addition, when the peripheral edge, opposite to the air inlet airbag 2, of the gas diffusion airbag 4 is connected to the other airbag 205, the fixing portion 67 may be mounted at a position at which the gas diffusion airbag 4 is connected to the other airbag 205 (i.e., the position of the ventilated airway 203 between the gas diffusion airbag 4 and the other airbag 205). The air outlet portion 65 is accommodated in the gas diffusion airbag 4, such that the air outlet port 651 is suspended in the gas diffusion airbag 4, thereby smoothly inflating the gas diffusion airbag 4.

When the one-way air admittance channel 60 is opened, the air outlet port 651 is opened, the upper sheet 61 and the lower sheet 62 at the air outlet port 651 are separated, and gas flows inside the gas diffusion airbag 4 via the air outlet port 651, and when the one-way air admittance channel 60 is closed, the air outlet port 651 is closed due to contact and adsorption between the upper sheet 61 and the lower sheet 62. One or more air outlet ports 651 may be arranged, and consist of a dividing line (e.g., FIG. 5 to FIG. 7, etc.), an aperture (e.g., FIG. 10, etc.), or a combination thereof (FIG. 8 and FIG. 9) formed in the upper sheet 61 and/or the lower sheet 62, with the specific shapes not being particularly limited. When the air outlet port 651 is formed in both the upper sheet 61 and the lower sheet 62, the air outlet port 651 of the upper sheet 61 and the air outlet port 651 of the lower sheet 62 do not necessarily overlap with each other with the same shape.

Figure 5:
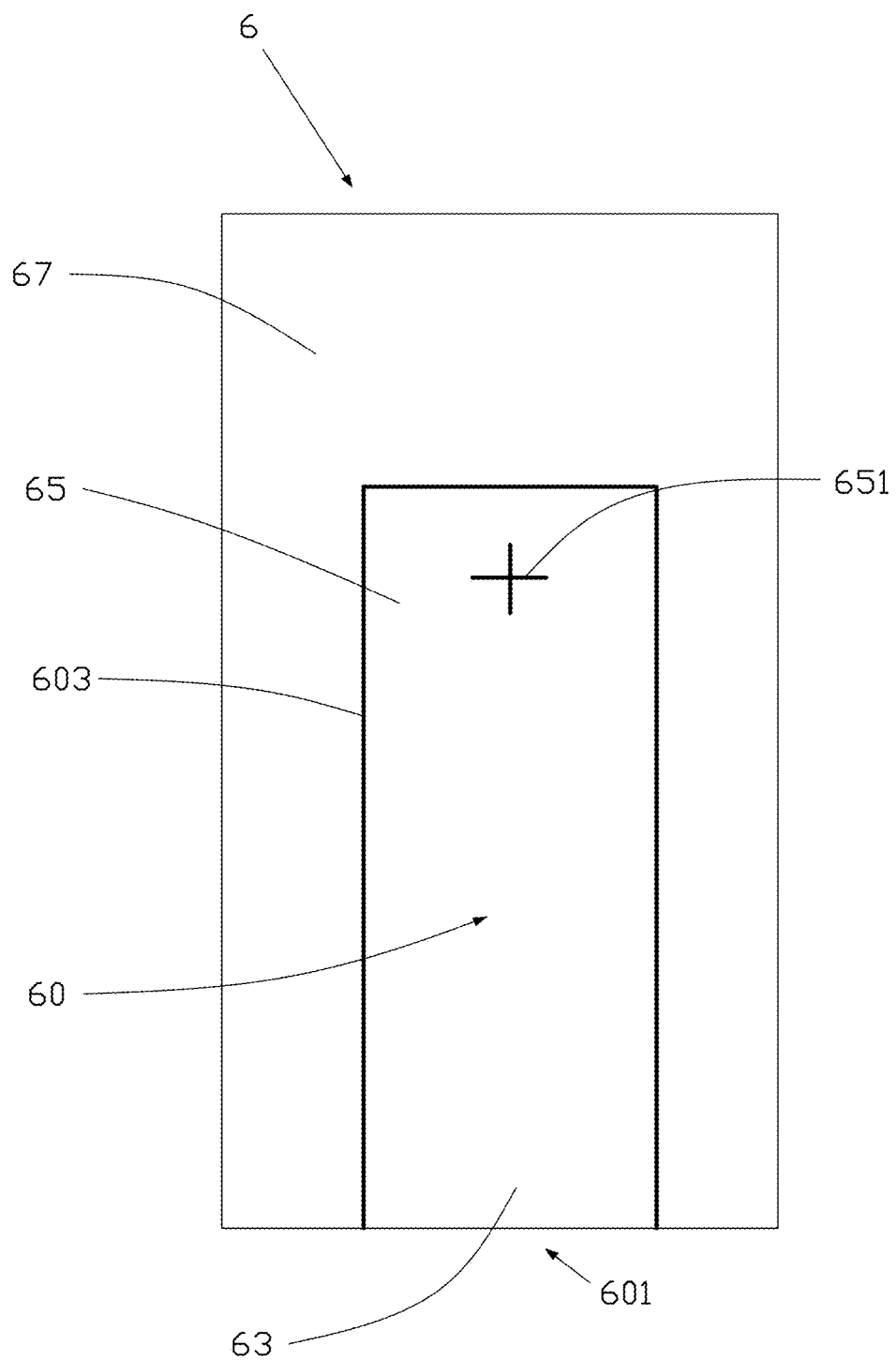
FIG. 5 is a schematic diagram of another example of a one-way air admittance member according to the present invention.

In addition, the air outlet portion 65 is further provided with a junction portion 652. The junction portion 652 is overlapped at least partially with the air outlet port 651, and the upper sheet 61 and the lower sheet 62 at the junction portion 652 can be joined by, for example, high-frequency welding, such that the portion overlapping with the air outlet port 651 is joined. As a result, by means of the junction portion 652, inability of the air outlet port 651 in tightly closing due to ageing material of the one-way air admittance member 6 after the air outlet port 651 is closed and opened repeatedly for multiple times can be avoided. The junction portion 652 may be formed as a circle (e.g., FIG. 3 and FIG. 6), a portion of a circle (e.g., FIG. 9), a line (e.g., FIG. 7 and FIG. 8), an irregular shape, or a combination thereof, which is not specifically limited herein. In addition, it will be appreciated that the junction portion 652 may also be omitted (as shown in FIG. 5).

The fixing portion 67 is configured to fix the one-way air admittance member 6 in a flat state, and the fixing portion 67 is a portion of the one-way air admittance member 6 extending from the air outlet portion 65 to the side edges 613, 623, and is normally overlapped with the peripheral edge of the gas diffusion airbag 4, but is not limited hereto, and the fixing portion 67 can be one portion or some portions of the portion extending from the air outlet portion 65 to the side edges 613, 623 for bonding with the upper cushion body 207 and/or the lower cushion body 209 of the cushion airbag pad 200. In addition, the side edges 611 and the side edges 621 of one side or both sides (i.e., left side and/or right side) of the one-way air admittance channel 60 may further extend and may be mounted to be overlapping with the peripheral edge of the gas diffusion airbag 4. That is, the fixing portion 67 and the air inlet portion 63 oppositely arranged at two ends of the one-way air admittance member 6 are fixed to the cushion airbag pad 200, and the side edges 611 and the side edges 621 on one side or both sides are also fixed to the cushion airbag pad 200.

It will be appreciated that the structure of the one-way air admittance member 6 is not limited to being formed by combining the upper sheet 61 with the lower sheet 62, e.g., the one-way air admittance member 6 may be composed of an integrated pouch-like element which is open on one side. With no need of a combination between the upper sheet 61 and the lower sheet 62, the one-way air admittance member 6 of the pouch-like element omits a combination step, thereby lowering the process cost and improving the production efficiency. In addition, the one-way air admittance member 6 can also be formed when the upper sheet 61 and the lower sheet 62 are joined along a boundary of a specifically-shaped one-way air admittance channel 60 (e.g., the boundary 603 of FIG. 5 to FIG. 14), in this case, the upper sheet 61 and the lower sheet 62 may be or may not be joined with each other in the outer region of the boundary 603 of the one-way air admittance channel 60, which is not limited herein.

Specifically, referring to FIG. 5 to FIG. 14, cases in which the boundary 603 is set to form the one-way air admittance channel 60 are enumerated.

The boundary 603 may be formed in a "U" shape as shown in FIG. 5 to enclose the opening 601 of the air inlet portion 63. The one-way air admittance channel 60, the air inlet portion 63, and the air outlet portion 65 are formed inside the boundary 603, and the linearly crossed air outlet port 651 is shown. The fixing portion 67 is an outer portion of the bottom of the 'U' shape in the one-way air admittance member 6. By forming the boundary 603 into a "U" shape, the gas flow in the one-way air admittance channel 60 is more concentrated, such that the air outlet port 651 can be easily opened and inflation becomes easy. In addition, it can be appreciated that in addition to the fixing portion 67 for fixing the one-way air admittance member 6, the left side portion and/or the right side portion extending from the boundary 603 to the side edges 611, 621 may also act as an additional fixing portion for fixing the side direction of the one-way air admittance member 6, and it can be understood that, as long as the side edges of the one-way air admittance member 6 extend beyond a bulging region of the gas diffusion airbag 4, the shape and the fixing position of the left side portion and the right side portion can be set arbitrarily.

Figure 6:
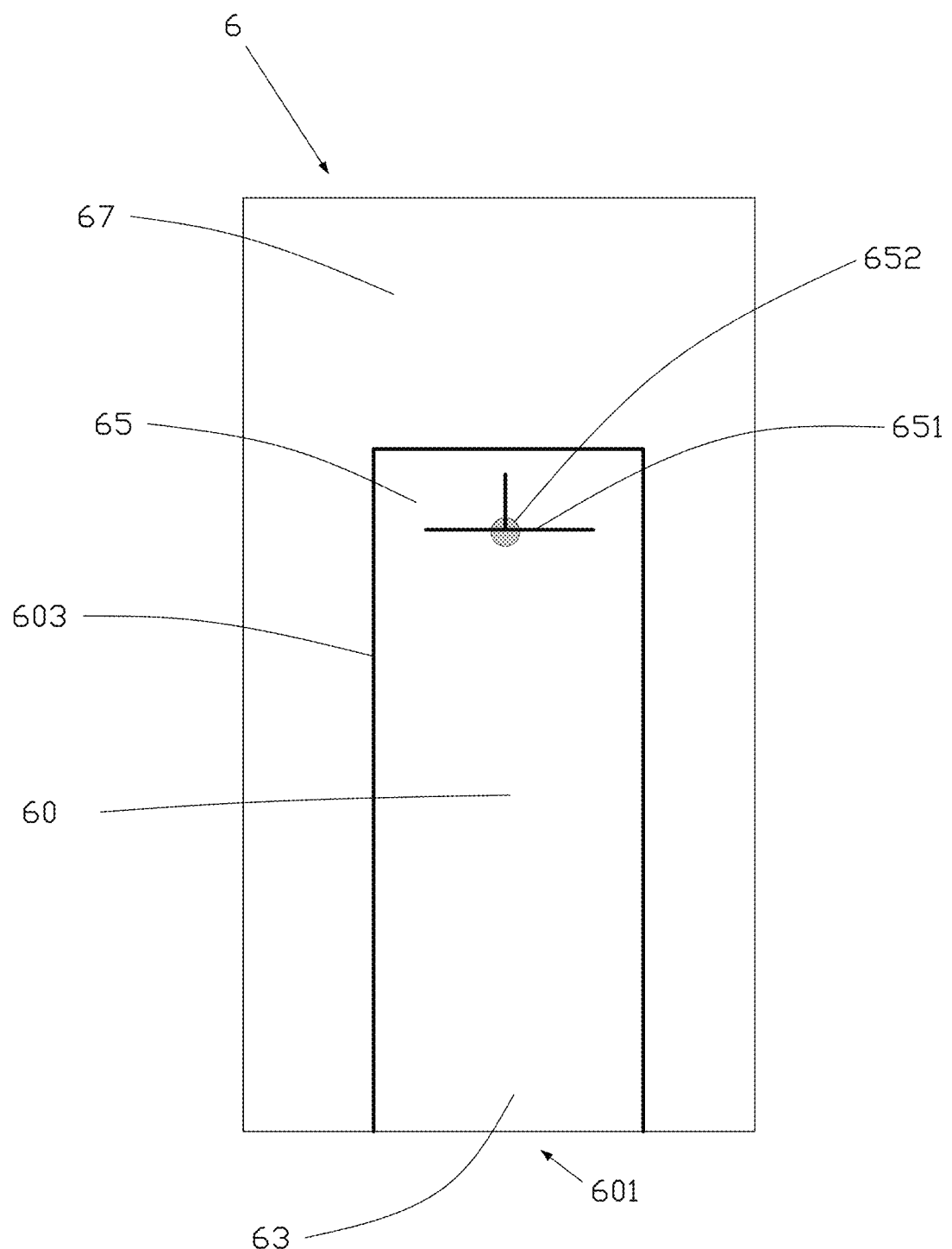
FIG. 6 is a schematic diagram of another example of a one-way air admittance member according to the present invention.

As shown in FIG. 6, this example differs from FIG. 5 only in that the shape of the linearly crossed air outlet port 651 is different from that in FIG. 5, and that a junction portion 652 is formed at the crossed position of the air outlet port 651, and the shape of the junction portion 652 is formed as a circle.

Figure 7:
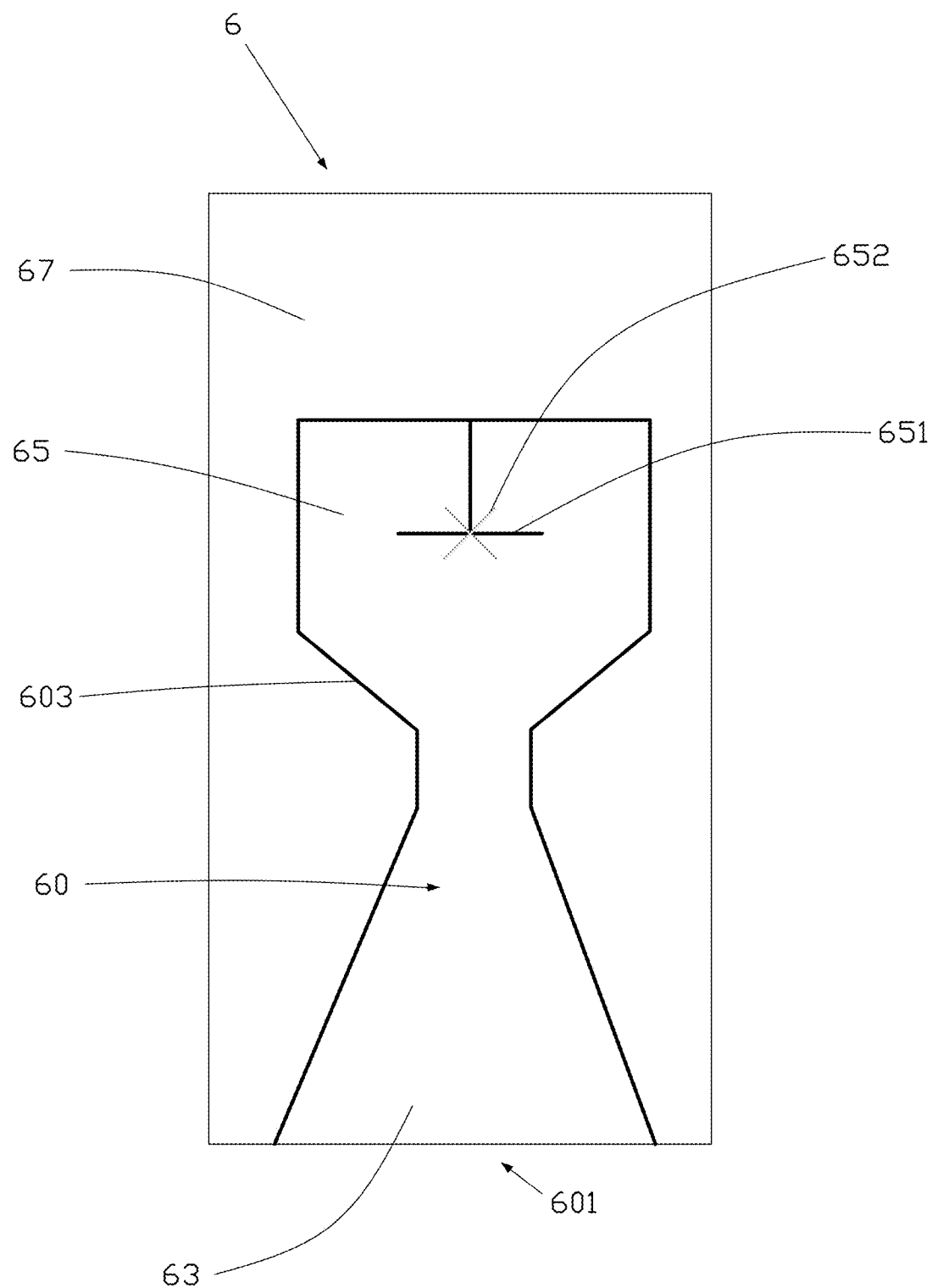
FIG. 7 is a schematic diagram of another example of a one-way air admittance member according to the present invention.

As shown in FIG. 7, in this example, on the basis of FIG. 6, the contours of the boundary 603 and the corresponding air inlet portion 63 and the air outlet portion 65 are changed, and the shape of the junction portion 652 is changed to a linearly crossed form. The contour of the boundary 603 at the air inlet portion 63 becomes gradually narrower towards the middle portion, and the contour at the air outlet portion 65 has a portion that becomes gradually larger as away from the middle portion, and the boundary 603 is the narrowest in the middle portion, such that pressure of the gas is increased when the gas enters along the air inlet portion 63, and further the air outlet port 651 is easily opened, and inflation becomes easy.

Figure 8:
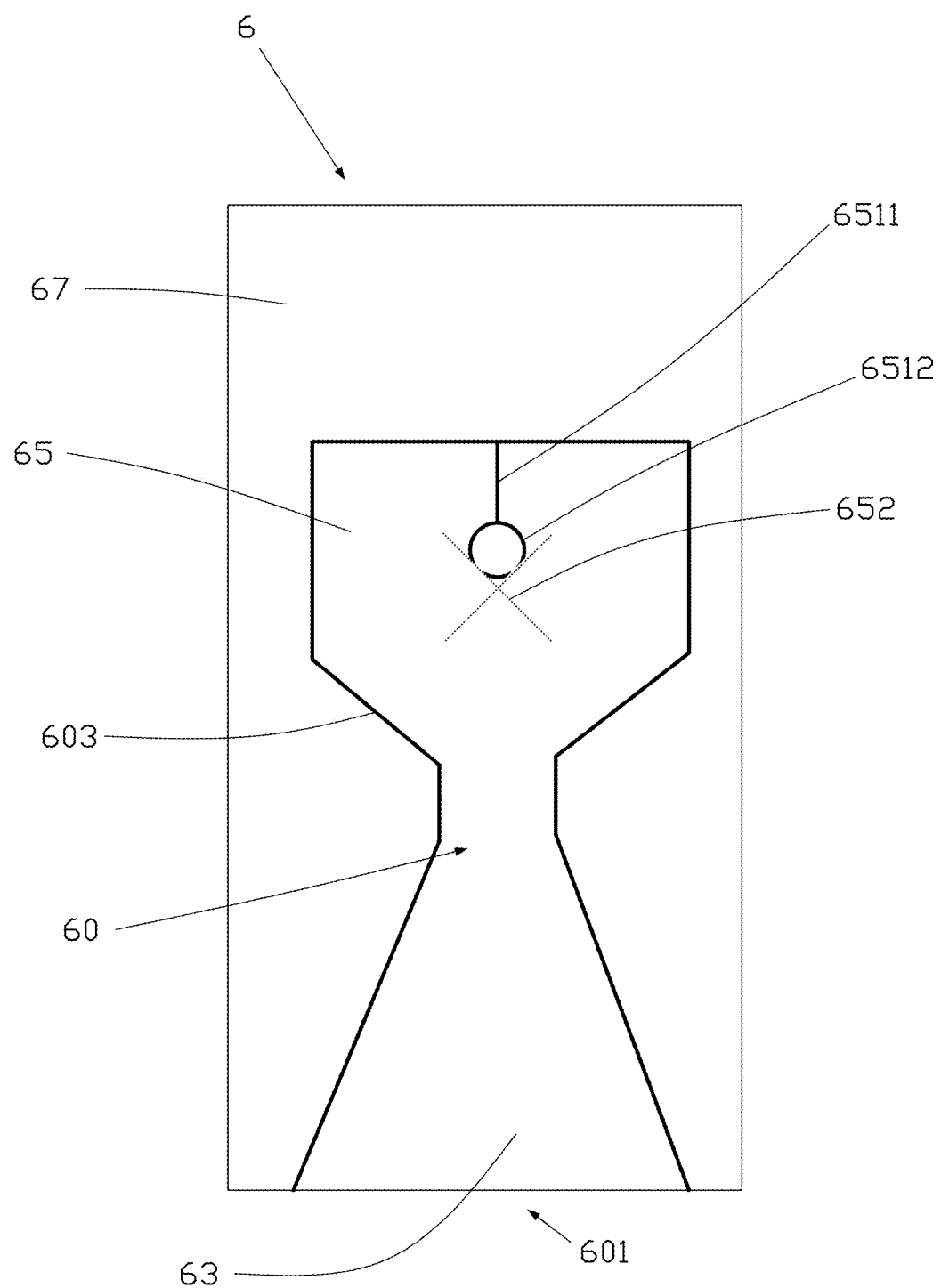
FIG. 8 is a schematic diagram of another example of a one-way air admittance member according to the present invention.

As shown in FIG. 8, the example illustrates a form in which the air outlet port 651 includes a linear first air outlet port 6511 and a circular second air outlet port 6512 and the junction portion 652 is partially overlapped with a second air outlet port 6512 of one of the air outlet ports 651.

Figure 9:
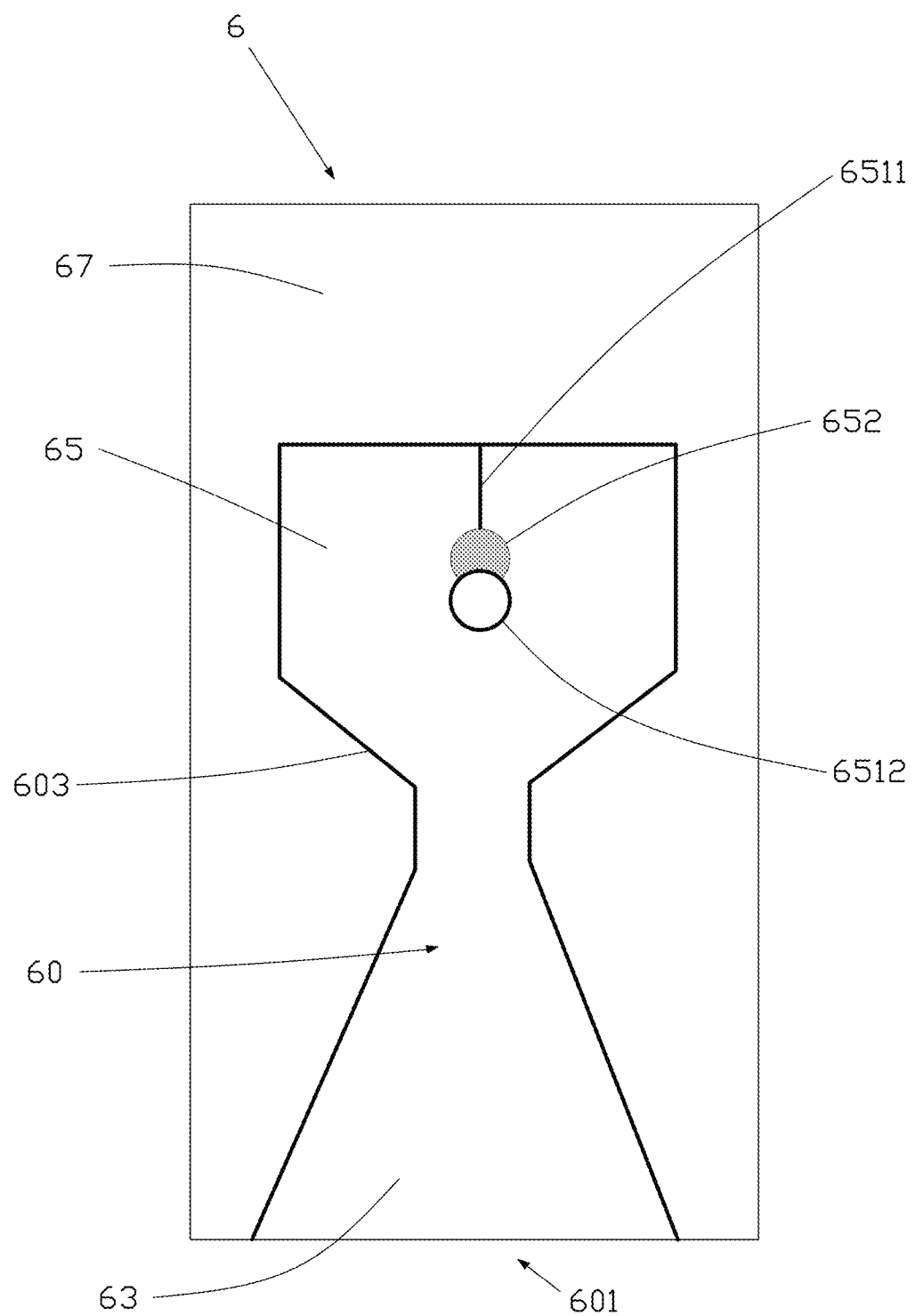
FIG. 9 is a schematic diagram of another example of a one-way air admittance member according to the present invention.

As shown in FIG. 9, the example illustrates a form in which the air outlet port 651 includes a linear first air outlet port 6511 and a circular second air outlet port 6512 and the junction portion 652 is partially overlapped with both the first air outlet port 6511 and the second air outlet port 6512.

Figure 10:
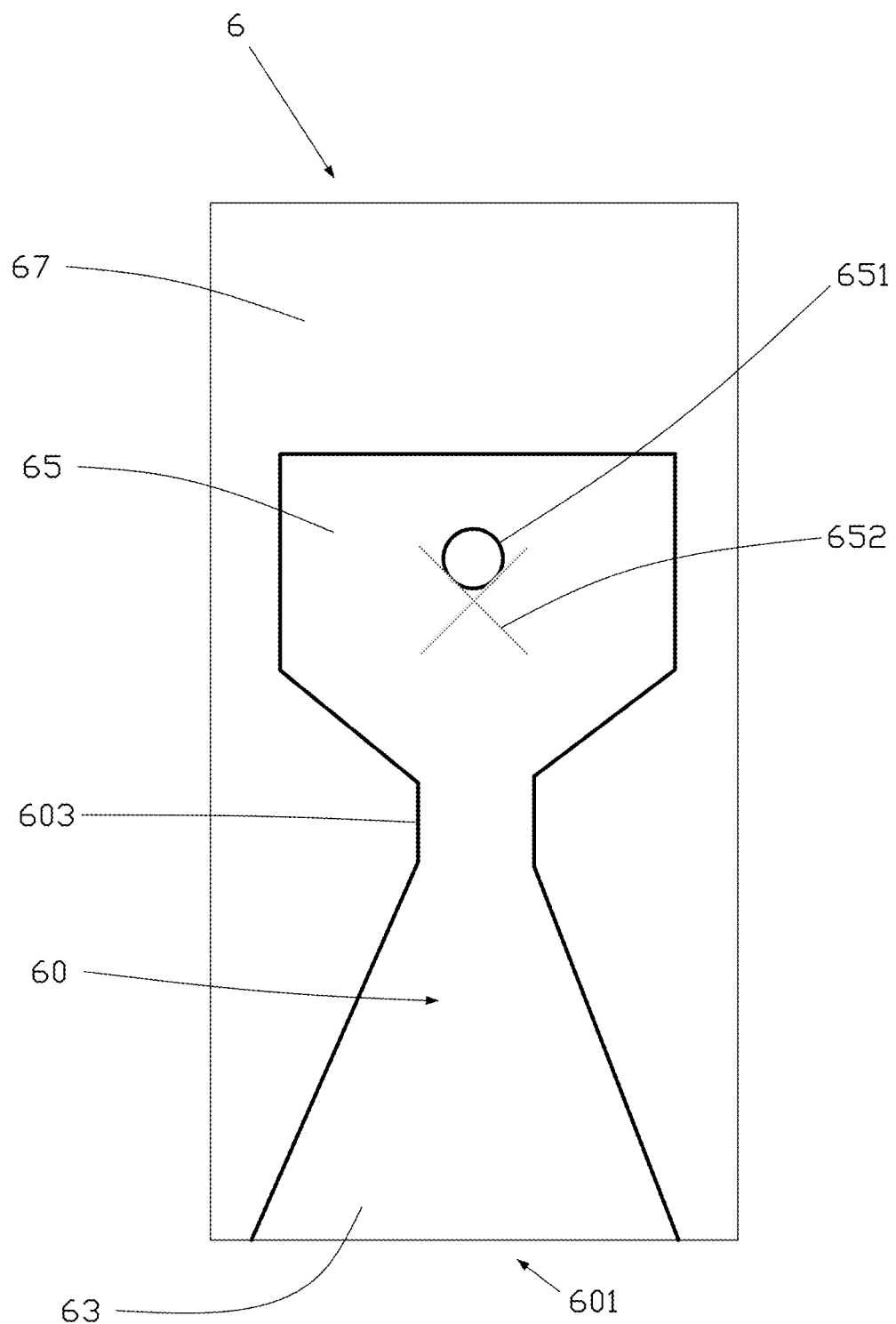
FIG. 10 is a schematic diagram of another example of a one-way air admittance member according to the present invention.

As shown in FIG. 10, the example illustrates the form of the circular air outlet port 651 and the linearly crossed junction portion 652.

Figure 11:
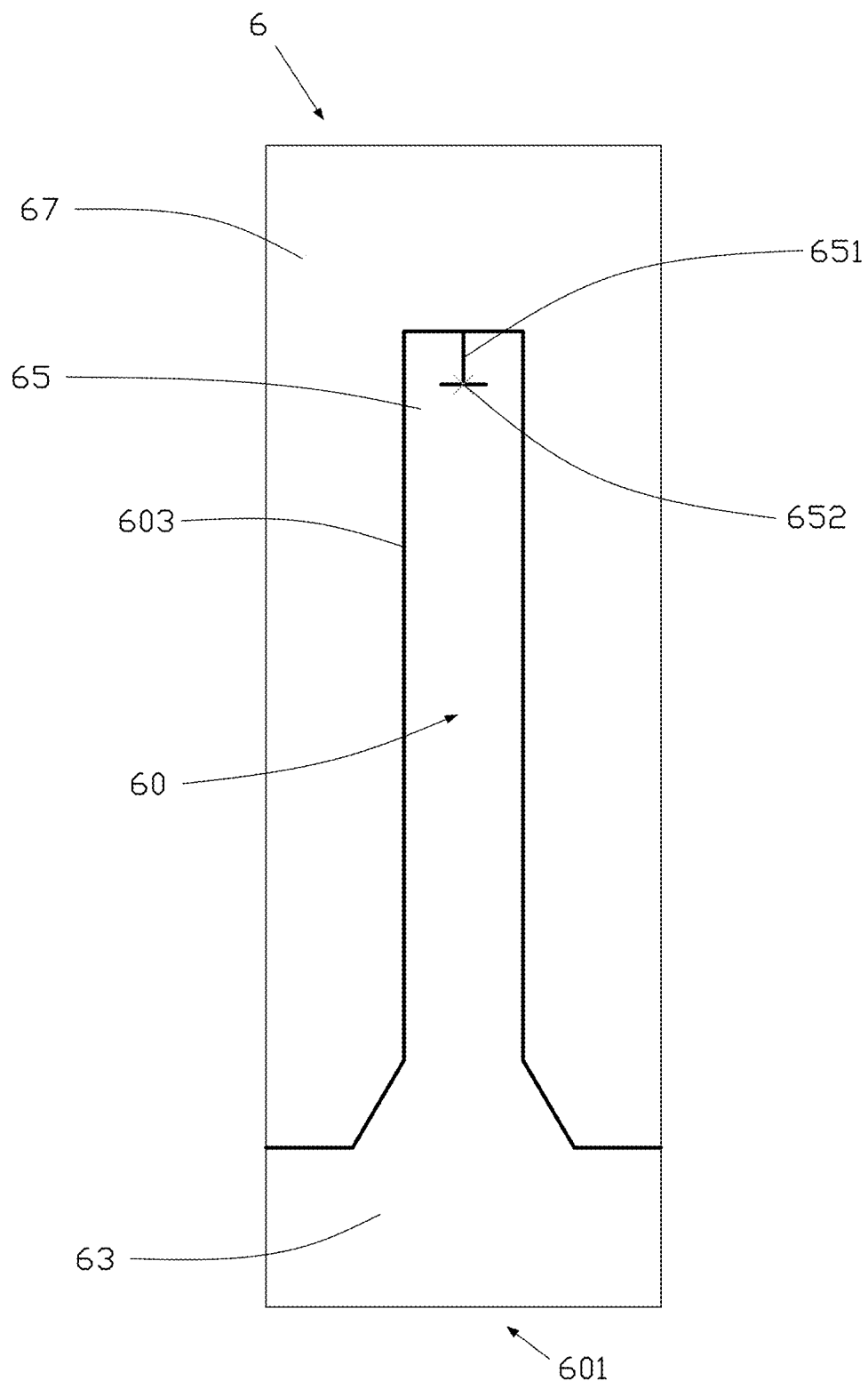
FIG. 11 is a schematic diagram of another example of a one-way air admittance member according to the present invention.

As shown in FIG. 11, the example illustrates a form in which part of the side edges 611, 621 of the air inlet portion 63 are not closed. As a result, when the air inlet portion 63 is mounted on an inner wall of the air inlet airway 3, mounting is convenient, and the problem that air inlet is influenced by contraction of the air inlet portion 63 due to hot mounting is avoided.

In addition, in the present application, the setting of the form of the junction portion 652 is not limited to the above examples, the junction portion 652 may not be overlapped with the air outlet port 651 or the first air outlet port 6511 and the second air outlet port 6512, as long as the junction portion 652 is arranged around any one of the air outlet port 651, or the first air outlet port 6511 and the second air outlet port 6512, so as to ensure that the air outlet port 651, or the first air outlet port 6511 and/or the second air outlet port 6512 are joined.

Figure 12:
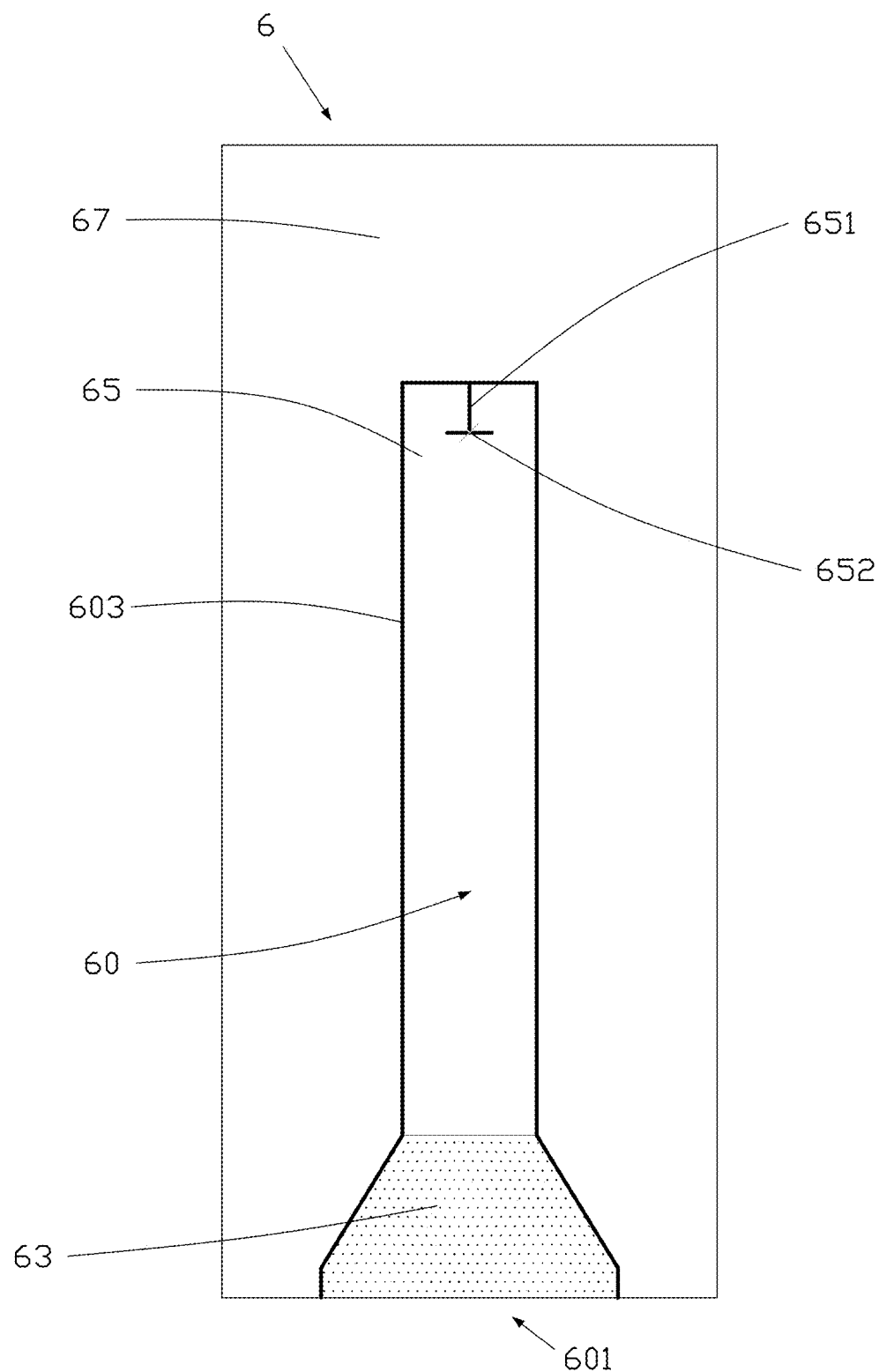
FIG. 12 is a schematic diagram of another example of a one-way air admittance member according to the present invention.

As shown in FIG. 12, an inner wall of the air inlet portion 63 is coated with an oily anti-adhesive material, such as printing ink, or the inner wall is roughened, therefore, the opening 601 of the air inlet portion 63 can also be easily opened even in a closed state.

Figure 13:
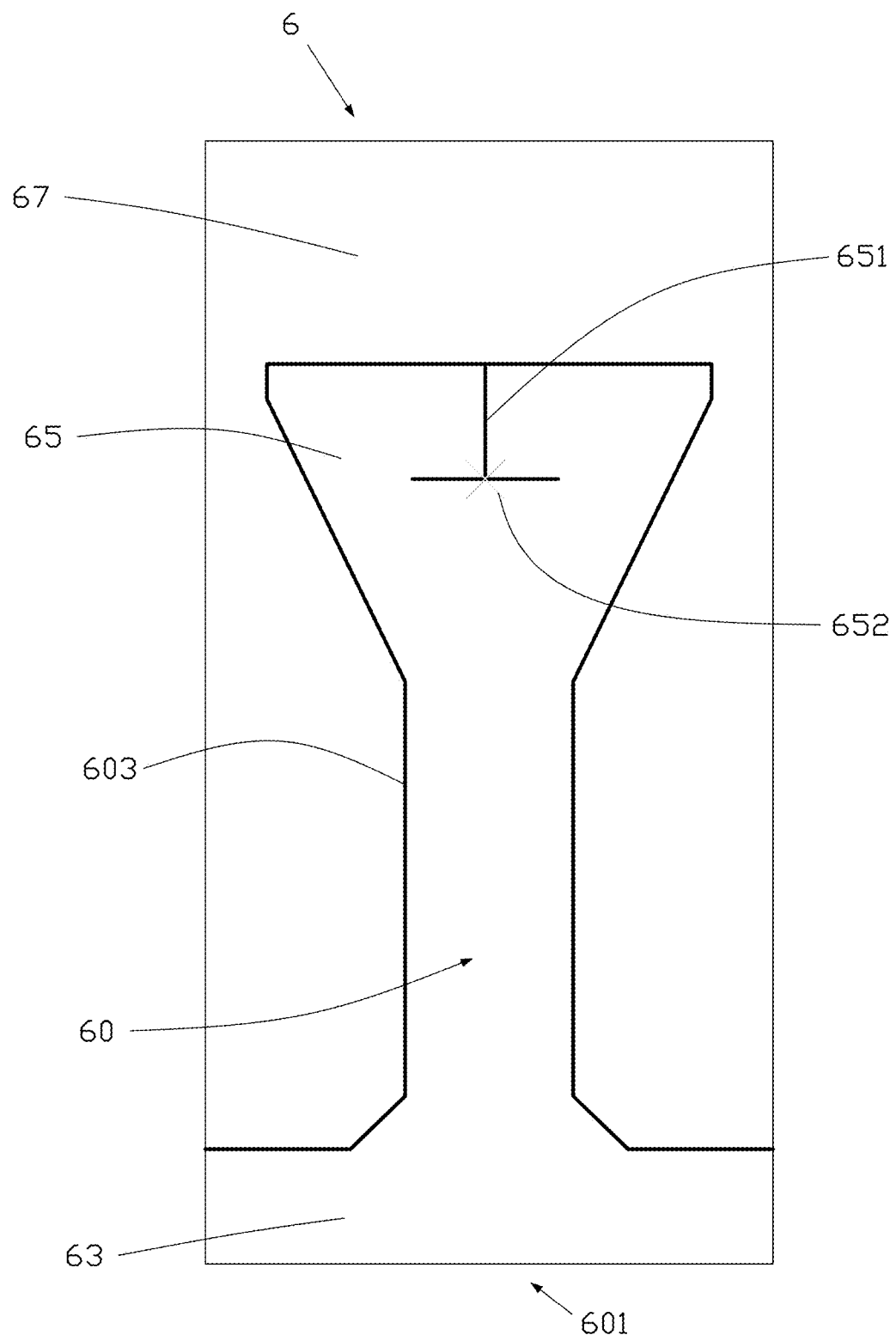
FIG. 13 is a schematic diagram of another example of a one-way air admittance member according to the present invention.

As shown in FIG. 13, as compared to the example of FIG. 7, as to the contour of the boundary 603 at the air outlet portion 65, a portion of the contour which gradually becomes larger while away from the middle portion extends to the position corresponding to the air outlet port 651. Therefore, gas is filled in the gas outlet portion 65 in a concentrated manner, the air pressure near the air outlet port 651 becomes larger, the air outlet port 651 can be opened easily, and inflation becomes easy.

Figure 14:
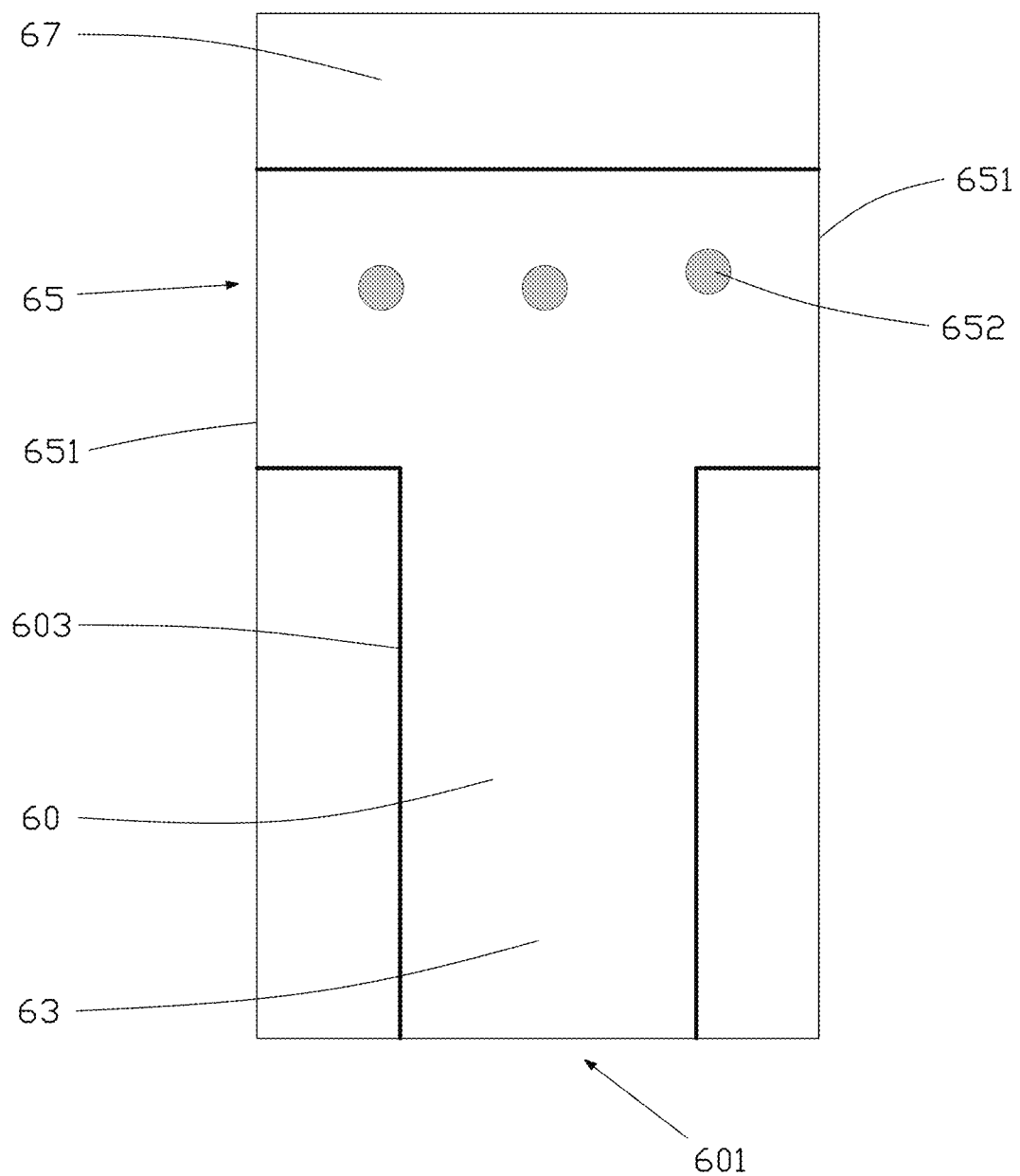
FIG. 14 is a schematic diagram of another example of a one-way air admittance member according to the present invention.

As shown in FIG. 14, the boundary 603 may be a multi-segment boundary, such that the one-way air admittance channel 60 is so formed that the air outlet port 651 of the air outlet portion 65 is arranged at two side edges of the one-way air admittance member 6, therefore, a process of forming the air outlet port 651 may be omitted, and in this case, the junction portion 652 may be arranged at the side edges of the one-way air admittance member 6 while overlapping with the air outlet port 651, or may be arranged near the air outlet port 651 without overlapping with the air outlet port 651. In addition, the junction portion 652 may be arranged singly or plurally as actually desired. In addition, the air outlet ports 65 may be arranged plurally as actually desired.

It can be understood that the shape of the above boundary 603 and the contours of the corresponding air inlet portion 63 and the air outlet portion 65, and the fixing portion 67 are not limited to the examples described above, and may be appropriately changed. The shapes of the air outlet port 651 and the junction portion 652 are not limited to the above illustrated examples and may be appropriately changed.

In addition, the air outlet assembly 80 is provided with a third airbag 8 and an air outlet port 5, and may also contain an air outlet valve (not shown in the figures). The third airbag 8 is communicated with adjacent airbags 205 via at least one ventilated airway 203, respectively, and the third airbag 8 is communicated with a gas diffusion airbag 4 via the cushion body 201 which is connected in series with all the airbags 205 and all the airways 203. A unidirectional air outlet valve is mounted at the air outlet port 5 of the third airbag 8, such that gas can only go out of but cannot enter the air outlet port, thereby ensuring unidirectional deflation of gas.

Figure 15:
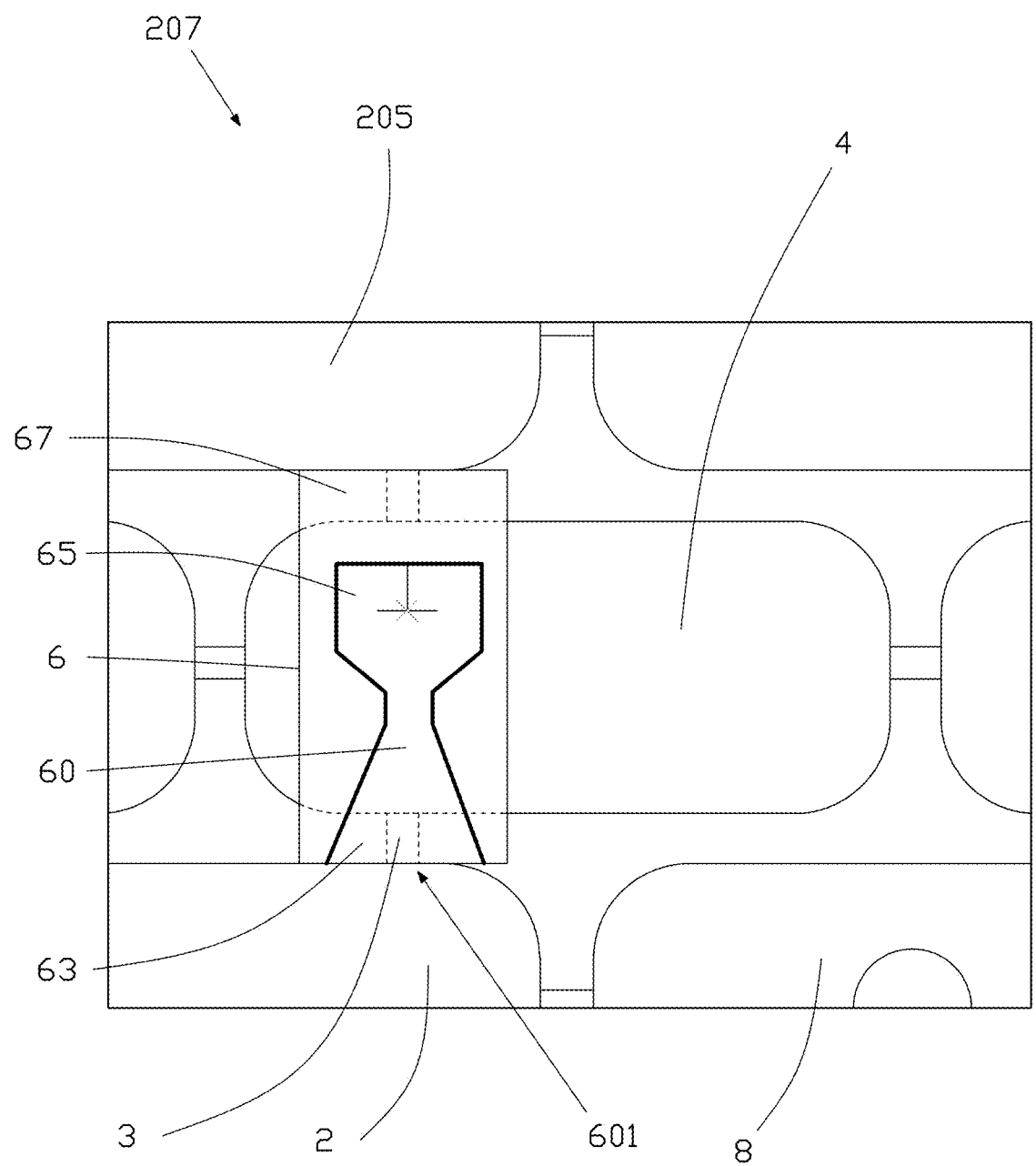
FIG. 15 is a schematic diagram of an example for illustrating mounting of a one-way air admittance member.
Figure 16:
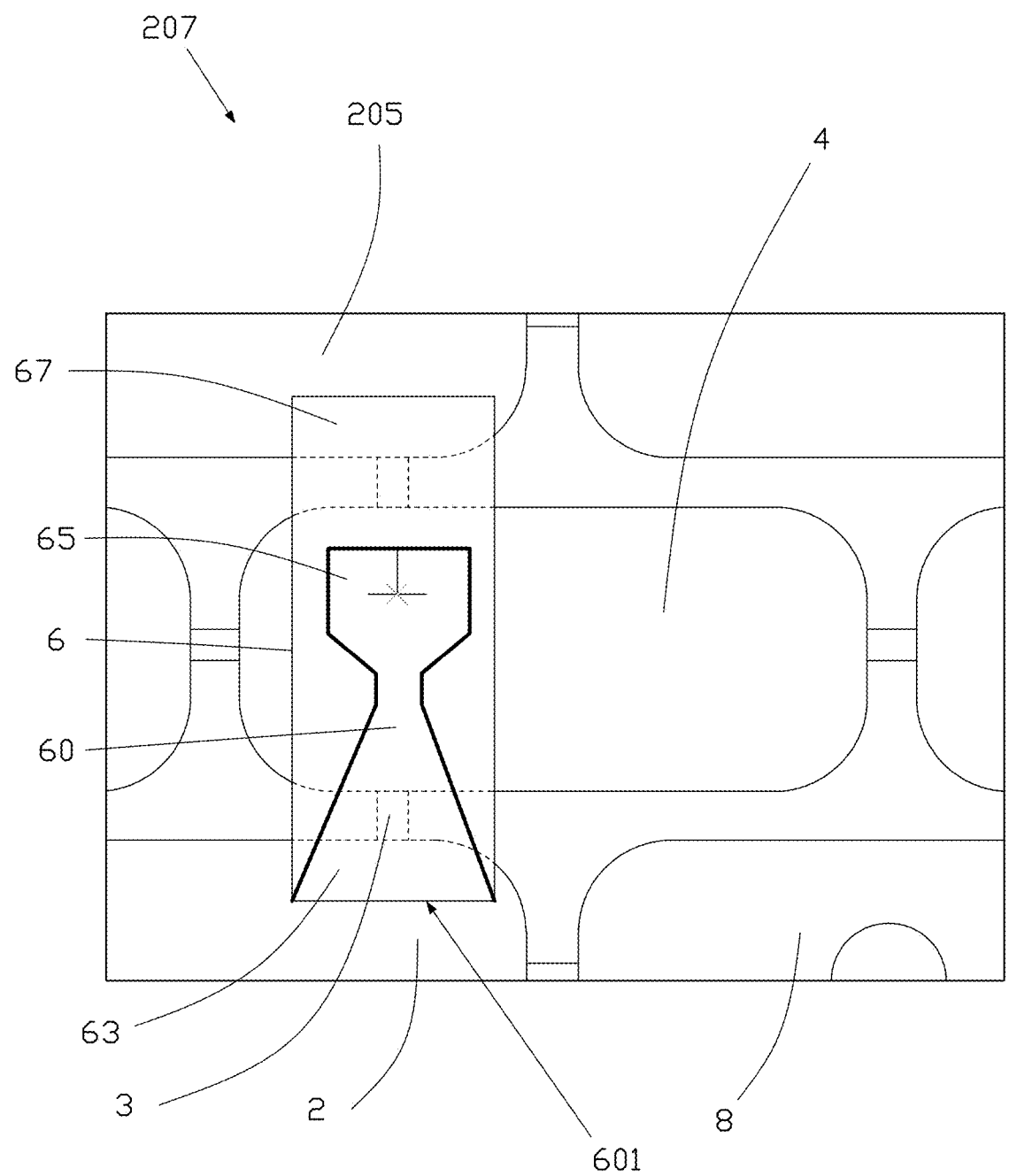
FIG. 16 is a schematic diagram of another example for illustrating mounting of a one-way air admittance member.
Figure 17:
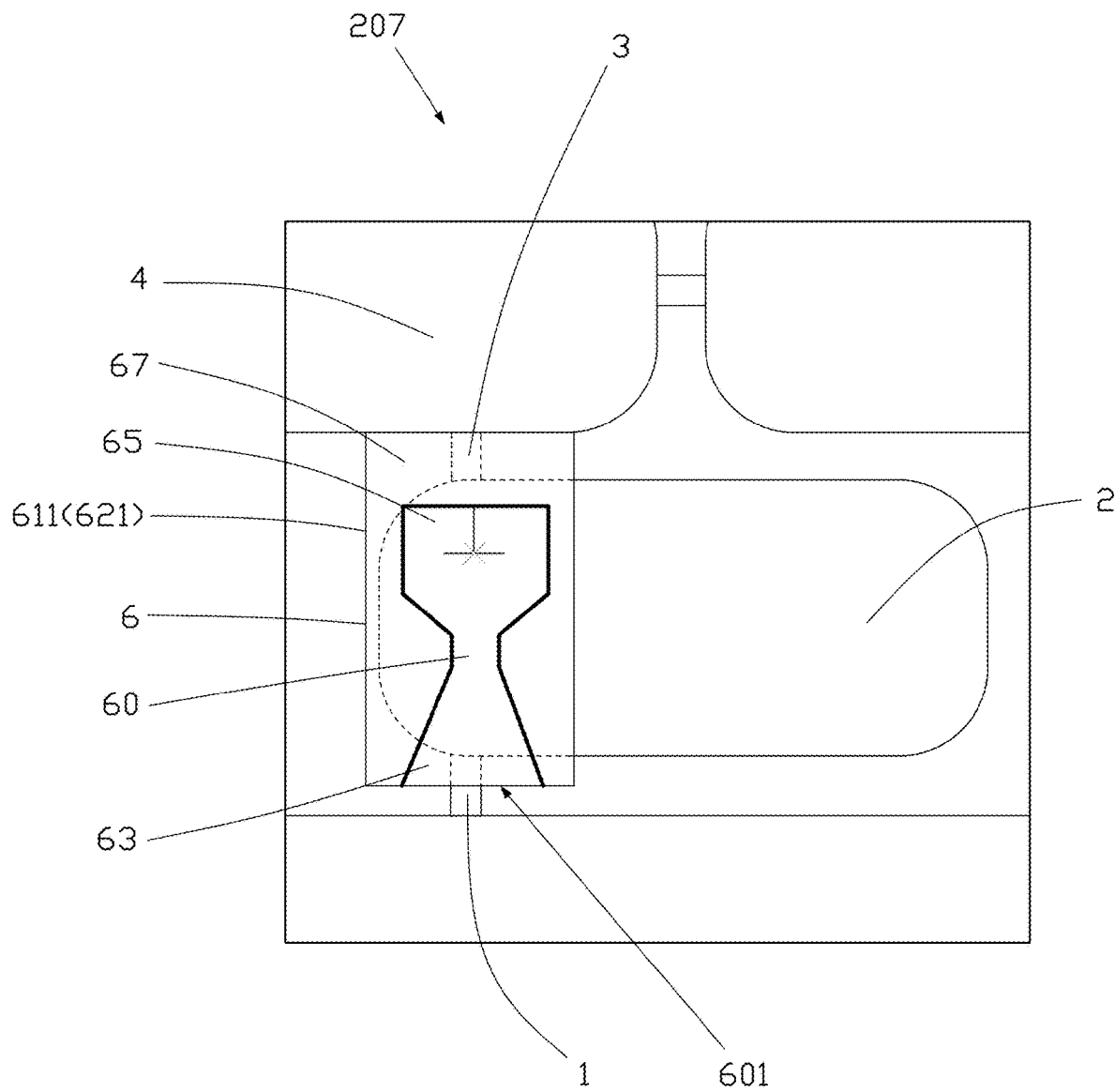
FIG. 17 is a schematic diagram of another example for illustrating mounting of a one-way air admittance member.
Figure 18:
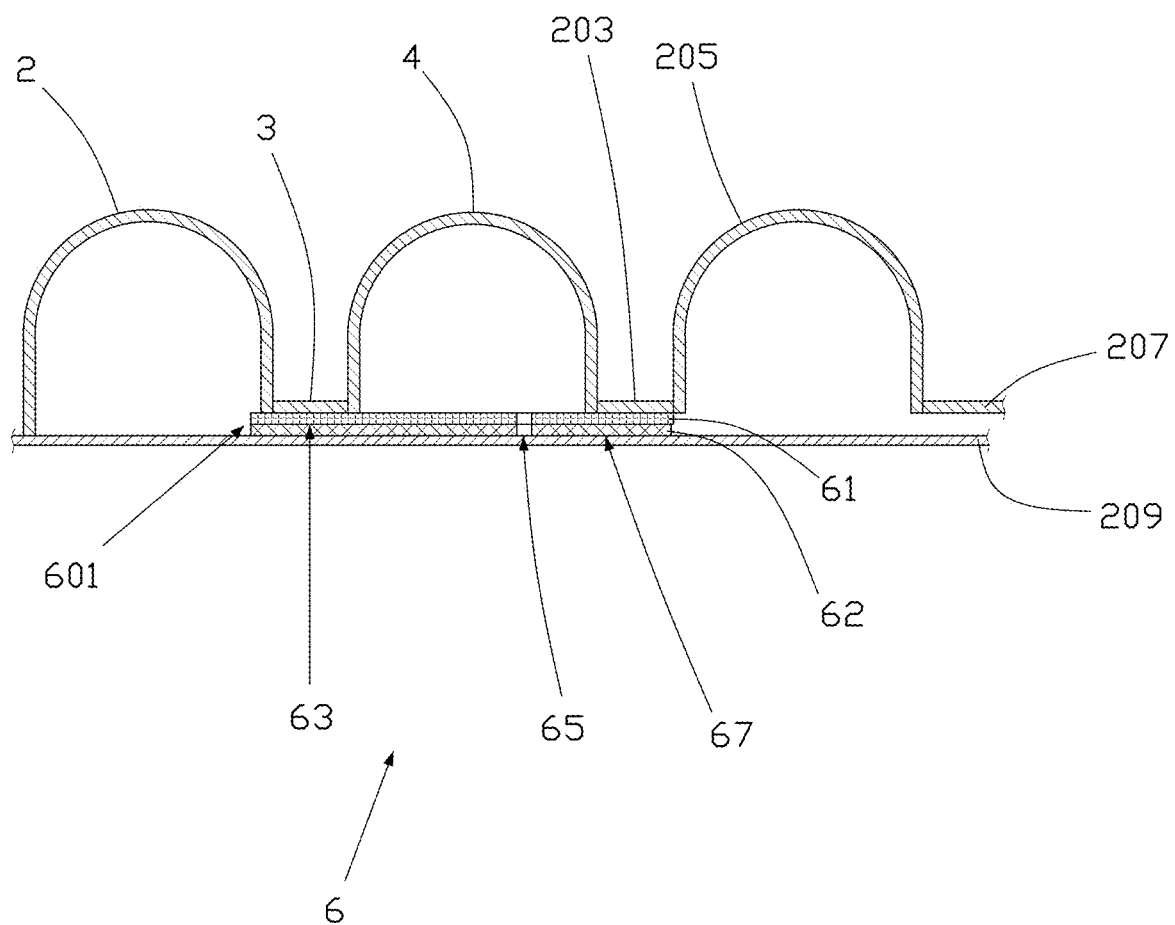
FIG. 18 is a schematic diagram of another example for illustrating mounting of a one-way air admittance member.
Figure 19:
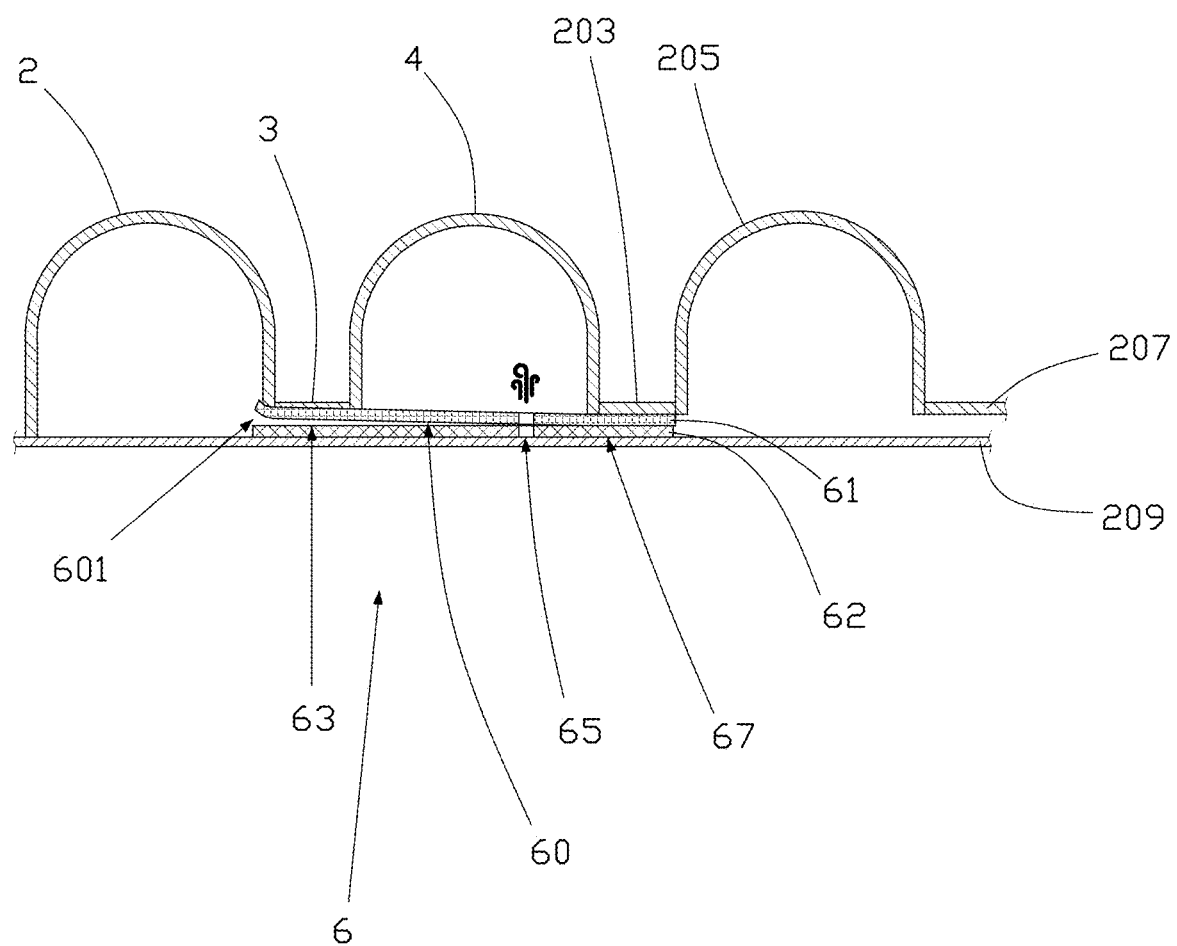
FIG. 19 is a schematic diagram of another example for illustrating mounting of a one-way air admittance member.

The mounting composition of the one-way air admittance member 6 is specifically illustrated below with reference to FIG. 15 to FIG. 19. It should be noted that FIG. 15 to FIG. 17 are partially schematic bottom views illustrating a cushion airbag pad 200 with the lower cushion body 209 being omitted. FIG. 18 to FIG. 19 are schematic diagrams illustrating that the air inlet portion 63 is mounted in a closed state, and are partially schematic sectional views showing the cushion airbag pad 200.

FIG. 15 illustrates an example of mounting composition of the one-way air admittance member 6. As shown in FIG. 15, the air inlet portion 63 is fixed while overlapping with the air inlet airway 3, the air outlet portion 65 is arranged inside the gas diffusion airbag 4, and the fixing portion 67 is fixed to a peripheral edge of the side, away from the air inlet airbag, of the gas diffusion airbag 4. The peripheral edge of the gas diffusion airbag 4 recorded in this specification is a position at which the gas diffusion airbag 4 is connected to an adjacent airbag, for example, the connecting position between the gas diffusion airbag 4 and the air inlet airbag 2 is the air inlet airway 3; the peripheral edge, opposite to the air inlet airbag 2, of the gas diffusion airbag 4 is a ventilated airway 203 between the gas diffusion airbag 4 and an airbag 205 opposite to the air inlet airbag 2. When the air inlet portion 63 and the fixing portion 67 at two ends of the one-way air admittance member are fixed, the one-way air admittance member 6 can be flatly arranged inside the cushion airbag pad 200, and the air outlet portion 65 can also be flatly accommodated in the gas diffusion airbag 4, such that the one-way air admittance member 6 is kept in a non-bending state in the gas diffusion airbag 4, and the gas inside the one-way air admittance channel 60 flows unobstructedly. In the present application, through such a one-way air admittance member 6, slow leakage of gas can be prevented, and air leakage of the cushion airbag pad is effectively prevented, and further frequent inflation is not required, thereby facilitating use, inhibiting a failure in favorable gas flow due to a curled one-way air admittance member 6 caused by ageing, and prolonging the service life.

In addition, the mounting composition of the air inlet portion 63 and the fixing portion 67 is not limited to the above examples. As shown in FIG. 16, the air inlet portion 63 may be further fixed to the air inlet airbag 2, and the fixing portion may also be further fixed to one airbag 205 adjacent to the gas diffusion airbag 4 and away from the air inlet airbag 2 (shown as the airbag 205 adjacent to an upper side of the air inlet airbag 2 in the figures). As a result, the one-way air admittance member 6 can be kept in a non-bending state between the air inlet airbag 2 and the gas diffusion airbag 4, and the gas in the one-way air admittance channel 60 can flow unobstructedly. Moreover, by increasing the width of the opening 601 in the air inlet portion 63, the opening 601 is opened easily and the air inlet is smoother.

In the examples of FIGS. 1, 15, and 16 above, an example of fixing two opposite ends of the one-way air admittance member 6 to the gas diffusion airbag 4 with the gas diffusion airbag 4 as a mounting airbag of the one-way air admittance member 6 is illustrated. However, the one-way air admittance member 6 can also take the air inlet airbag 2 as the mounting airbag of the one-way air admittance member 6. An example of taking the air inlet airbag 2 as a mounting airbag of the one-way air admittance member 6 is illustrated below with reference to FIG. 17.

As shown in FIG. 17, two opposite ends of the one-way air admittance member 6 are fixed to the air inlet airbag 2, i.e., the air inlet portion 63 is fixed to one side of the air inlet port 1 of the mounting airbag, the fixing portion 67 is fixed to the other side, away from the air inlet portion 63, of the mounting airbag, i.e., the side of the air inlet airway 3, and the one-way air admittance member 6 is communicated with the outside at the air inlet port 1, such that external gas unidirectionally enters the air inlet airbag 2 which serves as a mounting airbag. In addition, an air inlet port 1 can also be omitted, such that the opening 601 of the air inlet portion 63 is directly communicated to the outside, and external gas unidirectionally enters the air inlet airbag 2 which serves as a mounting airbag. In addition, the air inlet valve (not shown in the figures) and the elastomer 21 may also be omitted, such that the external gas directly enters through the opening 601 of the one-way air admittance member 6 through an externally arranged inflation component.

In addition, except for fixing the air inlet portion 63 and the fixing portion 67 to the peripheral edges of two opposite sides of the mounting airbag, the one-way air admittance member 6 may also be made such that the other sides (i.e., the side edges 611, 621) are also mounted to other peripheral edges of the mounting airbag. For example, as shown in FIG. 17, the side edges 611, 621 of the left side of the one-way air admittance member 6 are mounted to a peripheral edge, extending beyond a bulging region of the air inlet airbag 2 which serves as a mounting airbag, of the cushion body 201. It can be understood that the position of the one-way air admittance member 6 can be designed according to actual needs. Through the composition of the above FIG. 17, the one-way air admittance member 6 is kept in a non-bending state at the air inlet airbag 2, and gas can flow unobstructedly within the one-way air admittance channel 60.

In the above mounting example, the one-way air admittance member 6 can be attached to the cushion airbag pad 200 with the opening 601 being always kept in an open state. The gas diffusion airbag 4 serving as a mounting airbag is taken as an example for illustration below, the mounting airbag can be substituted into the air inlet airbag 2 according to reasonable changes, and the one-way air admittance member 6 can be attached to the cushion airbag pad 200 in a state in which the opening 601 is always kept in an open state.

As shown in FIG. 15, the upper sheet 61 and the lower sheet 62 at the air inlet portion 63 are attached to the position corresponding to the inner wall of the air inlet airway 3 in the upper cushion body 207 and the lower cushion body 209 of the cushion airbag pad 200, such that the upper sheet 61 and the lower sheet 62 at the air inlet portion 63 are attached to the inner wall of the air inlet airway 3, and the upper sheet 61 at the air inlet portion 63 is also formed to be bulged as the inner wall of the air inlet airway 3 is bulged, therefore, the air inlet portion 63 is always open and is communicated to the air inlet airbag 2, and the air inlet portion 63 can be prevented from being closed.

In addition, the air inlet portion 63 is fixed to the air inlet airway 3 and is further fixed to the air inlet airbag 2 as shown in FIG. 16, such that the upper sheet 61 and the lower sheet 62 at the air inlet portion 63 are attached to a position, corresponding to at least a portion of the inner wall of the air inlet airway 3 and the air inlet airbag 2, in the upper cushion body 207 and the lower cushion body 209 of the cushion airbag pad 200, the upper sheet 61 and the lower sheet 62 at the air inlet portion 63 are attached to at least a portion of the inner wall of the air inlet airway 3 and the air inlet airbag 2, and then the upper sheet 61 at the air inlet portion 63 is formed along with the bulging inner wall portion of the air inlet airbag 2 and the air inlet airway 3, thereby obtaining a larger opening 601 for smoother air inlet, and enabling the air inlet portion 63 to remain an open state even if the upper sheet 61 and the lower sheet 62 at the air inlet portion 63 droop or contract in subsequent process due to reasons such as ageing. As described above, the inner surface of the upper sheet 61 and the inner wall of the lower sheet 62 at the air inlet portion 63 can be coated with an oily anti-adhesive material such as printing ink, or the inner wall is roughened, therefore, even if the upper sheet 61 and the lower sheet 62 in the air inlet portion 63 droop or contract in subsequent process due to reasons such as ageing, the air inlet portion 63 is kept in an open state, the one-way air admittance member 6 can be kept in a non-bending state between the air inlet airbag 2 and the gas diffusion airbag 4, and gas in the one-way air admittance channel 60 can flow unobstructedly.

In addition, the one-way air admittance member 6 can also be attached to the cushion airbag pad 200 when the opening 601 is in a closed state. The gas diffusion airbag 4 serving as a mounting airbag is taken as an example for illustration below, but the mounting airbag can be substituted into the air inlet airbag 2 according to reasonable changes, and the one-way air admittance member 6 can be attached to the cushion airbag pad 200 when the opening 601 is in a closed state.

Even when the air inlet portion 63 is fixed to the air inlet airway 3 (FIG. 15) or the air inlet airway 3 and the air inlet airbag 2 (FIG. 16), as long as the opening 601 can be opened under a certain pressure difference and one-way air admittance can be achieved, the upper sheet 61 adjacent to the opening 601 of the air inlet portion 63 may also not be attached to the inner wall, corresponding to the air inlet airway 3, in the cushion airbag pad 200, such that the opening 601 is in a closed state. In this way, the opening 601 of the air inlet portion 63 can also be opened under a differential pressure from a closed state shown in FIG. 18 to be in a state in which the opening is open as shown in FIG. 19, such that the upper sheet and the lower sheet at the one-way air admittance channel 60 are separated, and air can flow, and gas can be supplied unidirectionally to the gas diffusion airbag 4. In this case, preferably, the inner surface of the upper sheet 61 and the inner wall of the lower sheet 62 in the air inlet portion 63 can be coated with an oily anti-adhesive material such as printing ink, or the inner wall is roughened, such that the opening 601 can be opened easily and air ventilation is made smoother.

In addition, the fixing portion 67 is arranged at a peripheral edge, away from the air inlet airbag, of the gas diffusion airbag 4 in such a manner that the fixing portion 67 is sandwiched between the upper cushion body 207 and the lower cushion body 209 of the cushion airbag pad 200 and is attached to the upper cushion body 207 and the lower cushion body 209. As an example of fixing the fixing portion 67, the fixing portion 67 of the one-way air admittance member 6 can be first fixed to a position, corresponding to the peripheral edge, away from the air inlet airbag, of the gas diffusion airbag 4, of the upper cushion body 207, and then the upper cushion body 207 and the lower cushion body 209 can be joined (welded) together. As another example, the fixing portion 67 of the one-way air admittance member 6 can be first fixed to the position, corresponding to the peripheral edge, away from the air inlet airbag, of the gas diffusion airbag 4, of the lower cushion body 209, and then the upper cushion body 207 and the lower cushion body 209 can be joined together. In addition, the process of mounting the one-way air admittance member 6 relative to the lower cushion body 209 is performed simultaneously with an attaching process for forming the side edges 611, 621, and/or the boundary 603 of the upper sheet 61 and the lower sheet 62.

In addition, the plurality of airbags 205, the air inlet airbag 2, the gas diffusion airbag 4, and the third airbag 8 are formed to be still higher than the plurality of airways 203 and the air inlet airway 3 after gas is released, thereby preventing unsmooth air flow in the cushion airbag pad 200 when the user presses the airway during airbag deflation.

In addition, it can be understood that the plurality of airways 203 and the air inlet airways 3 may be omitted, and adjacent airbags in the plurality of airbags 205, air inlet airbags 2, gas diffusion airbags 4, and third airbags 8 are directly communicated in series.

The cushion airbag pad 200 of the present application is suitable for use on surfaces that are subjected to pressure when backpacks, waist packs, shoulder bags, arm bags, and other bag products such as shoulder straps, heavy lifting handles and the like come into contact with people. The cushion airbag pad 200 is also applicable to mattresses, seat cushions, back cushions, shoe insoles and the like and is beneficial for the human body which is pressed for a long time. When the human body is under pressure for a long time, local blood circulation is not smooth and people feel painful, and the contact sites are airtight, thereby easily producing sweat and failing to effectively dissipate heat, making people feel uncomfortable, affecting the health of the skin, and leaving a hidden health problem. The cushion airbag pad 200 in the present application can buffer and relax the contact parts of the human body, and a gap between the airbags can provide a good passage for releasing heat of the human body.

What is claimed is:

1. A cushion airbag pad, comprising:
 a cushion body, comprising
  a pad body;
  a plurality of airbags; and
  a plurality of airways,
  wherein the plurality of airbags and the plurality of airways are formed on the pad body, the plurality of airbags are communicated through the plurality of airways, and the pad body isolates the plurality of airbags and the plurality of airways from the outside; and
 a one-way air admittance member mounted in the cushion body and internally provided with a one-way air admittance channel;
 wherein the one-way air admittance channel is provided with an air inlet port and at least one air outlet port which are intercommunicated with each other, the one-way air admittance channel allows gas to flow unidirectionally from the air inlet port to the at least one air outlet port, thereby permitting the gas to unidirectionally enter the plurality of airbags and the plurality of airways of the cushion body and preventing leakage of gas to the outside of the cushion body, and at least two ends of the one-way air admittance member are fixed to the cushion body, and one end of the at least two ends, away from the air inlet port, of the one-way air admittance member is fixed to the pad body, such that warping of the one-way air admittance member is inhibited, thereby keeping the one-way air admittance member in a non-bending state, and wherein the one-way air admittance member comprises a film-like upper sheet and a film-like lower sheet, the cushion airbag pad comprises a junction portion, the upper sheet and the lower sheet at the junction portion are joined together, the one-way air admittance member allows the gas to flow unidirectionally from the air inlet port to the at least one air outlet port and to flow out of the at least one air outlet port while bypassing the junction portion, wherein the upper sheet and the lower sheet at the at least one air outlet port are separated when the one-way air admittance member performs one-way air admittance.

2. The cushion airbag pad according to claim 1, wherein the one-way air admittance member is a pocket-like structure, with one side open and the remaining sides sealed, and
the at least one air outlet port is formed between the two ends of the one-way air admittance member.

3. The cushion airbag pad according to claim 1, wherein an end edge at one side in two ends of the one-way air admittance member is open to form the air inlet port, an end edge at the opposite side in the two ends is closed to form a fixing portion, and at least a portion of the fixing portion is sandwiched in the pad body, and
the at least one air outlet port is formed between two ends of the one-way air admittance member.

4. The cushion airbag pad according to claim 1, wherein the plurality of airbags comprises a diffusion airbag, and
the diffusion airbag is communicated with the at least one air outlet port diffuses gas towards the plurality of airbags on a downstream side when the one-way air admittance channel allows gas to flow unidirectionally from the air inlet port to the at least one air outlet port,
the plurality of airways comprise a first airway connected to an upstream side of the diffusion airbag,
the upper sheet and the lower sheet are overlapped with each other, the one-way air admittance channel is formed between the upper sheet and the lower sheet, when the upper sheet and the lower sheet at the one-way air admittance channel are separated, gas unidirectionally enters the plurality of airbags and the plurality of airways of the cushion body, and when at least a portion of the upper sheet and the lower sheet at the one-way air admittance channel is closed, the one-way air admittance channel prevents gas inside the cushion body from leaking to the outside of the cushion body,
the one-way air admittance member is provided with an air inlet portion, the upper sheet and the lower sheet at the air inlet portion are fixed to the inner wall of the first airway when the upper sheet and the lower sheet are open, so as to form the air inlet port, and
the fixing portion of the one-way air admittance member is fixed to the pad body at the opposite side of the first airway, such that the at least one air outlet port is located in the diffusion airbag.

5. The cushion airbag pad according to claim 4, wherein the periphery of the air inlet port of the air inlet portion is fixed to the pad body.

6. The cushion airbag pad according to claim 1, wherein at least one side edge in a width direction of the one-way air admittance member is also fixed to the pad body.

7. The cushion airbag pad according to claim 1, wherein the junction portion at least partially overlaps the at least one air outlet port.

8. The cushion airbag pad according to claim 7, wherein the at least one air outlet port is divided into at least two air outlet ports by the at least one overlapping portion, and the at least one air outlet port comprises a first air outlet port and a second air outlet port arranged adjacent to each other, and
the junction portion is connected between the first air outlet port and the second air outlet port.

9. The cushion airbag pad according to claim 1, wherein the junction portion is not overlapped with the at least one air outlet port and is arranged around the at least one air outlet port.

10. A cushion airbag pad, comprising:
a cushion body, comprising
a pad body;
a plurality of airbags; and
a plurality of airways,
wherein the plurality of airbags and the plurality of airways are formed on the pad body, the plurality of airbags are communicated through the plurality of airways, the pad body isolates the plurality of airbags and the plurality of airways from the outside; and
a one-way air admittance member mounted in the cushion body to allow gas to unidirectionally enter the plurality of airbags and the plurality of airways of the cushion body and to prevent gas from leaking to the outside of the cushion body, wherein the one-way air admittance channel is provided with an air inlet port and at least one air outlet port which are intercommunicated with each other, the one-way air admittance member is further provided with a junction portion, the junction portion is connected to at least two adjacent air outlet ports, the one-way air admittance member allows gas to flow unidirectionally from the air inlet port to the at least one air outlet port and to flow out of the at least one air outlet port while bypassing the junction portion.

11. The cushion airbag pad according to claim 10, wherein the one-way air admittance member comprises a film-like upper sheet and a film-like lower sheet, and
in the one-way air admittance member, the upper sheet and the lower sheet at the junction portion are joined together, the upper sheet and the lower sheet at the air inlet port are separated, the upper sheet and the lower sheet at the at least one air outlet port are not joined, and when gas enters, a difference in air pressure is generated at the air inlet port and the at least one air outlet port, so that the upper sheet and the lower sheet at the at least one air outlet port are separated due to an air pressure difference.

12. The cushion airbag pad according to claim 10, wherein
at least one air outlet port in the plurality of air outlet ports is spaced apart from the junction portion.

13. The cushion airbag pad according to claim 10, wherein
when viewed from above, a portion of the junction portion is closer to the upstream side than the at least one air outlet port, such that the one-way air admittance channel bypasses the junction portion and diverts the flow.

14. A cushion airbag pad, comprising:
a plurality of airbags;
a plurality of surrounding portions, wherein the plurality of airbags is surrounded by the plurality of surrounding portions; and
a plurality of airways in the plurality of the surrounding portions and connecting with the plurality of airbags, wherein each airway is in air communication with two adjacent airbags of the plurality of airbags;
an air admittance member including a first sheet and a second sheet overlapped to the first sheet, wherein the first sheet and the second sheet are received in an airbag of the plurality of airbags; and the air admittance member is fastened to the plurality of surrounding portions at two opposite ends of the air admittance member, and each of the two opposite ends of the air admittance member passes through the airbag;
the first sheet and the second sheet cooperatively define a channel with an air inlet port defined between the first sheet and the second sheet and a first air outlet port formed in the first sheet;
the first air outlet port is disposed in the airbag and opens to allow gas to flow upward into the airbag;
the air inlet port is disposed out of the airbag;
the first sheet and the second sheet are deformable, the channel is formed between the first sheet and the second sheet, the first sheet and the second sheet touch each other when the first sheet and the second sheet are located at an initial state, the first air outlet port is located at a closed position; and
when the gas from the air inlet port flows into the channel, the first sheet and the second sheet are pressed to deform and move away from each other, the first air outlet port is switched to an open position, so that the gas is permitted to enter the airbag via the channel and the first air outlet port.

15. A cushion airbag pad, comprising:
a plurality of airbags;
a plurality of surrounding portions, wherein the plurality of airbags is surrounded by the plurality of surrounding portions; and
a plurality of airways in the plurality of the surrounding portions and connecting with the plurality of airbags, wherein each airway is in air communication with two adjacent airbags of the plurality of airbags;
an air admittance member including a first sheet and a second sheet overlapped to the first sheet, wherein the first sheet and the second sheet are received in an airbag of the plurality of airbags; and the air admittance member is fastened to the plurality of surrounding portions at two opposite ends of the air admittance member, and each of the two opposite ends of the air admittance member passes through the airbag;
the first sheet and the second sheet cooperatively define a channel with an air inlet port defined between the first sheet and the second sheet and a first air outlet port formed in the first sheet;
the first air outlet port is disposed in the airbag and opens to allow gas to flow upward into the airbag;
the air inlet port is disposed out of the airbag;
a joint configuration is formed in the channel at which the first sheet is coupled to the second sheet, and the joint configuration is located along a gas route from the air inlet port to the first air outlet port.

16. A cushion airbag pad, comprising:
a plurality of airbags;
a plurality of surrounding portions, wherein the plurality of airbags is surrounded by the plurality of surrounding portions; and
a plurality of airways in the plurality of the surrounding portions and connecting with the plurality of airbags, wherein each airway is in air communication with two adjacent airbags of the plurality of airbags;
an air admittance member including a first sheet and a second sheet overlapped to the first sheet, wherein the first sheet and the second sheet are received in an airbag of the plurality of airbags; and the air admittance member is fastened to the plurality of surrounding portions at two opposite ends of the air admittance member, and each of the two opposite ends of the air admittance member passes through the airbag;
the first sheet and the second sheet cooperatively define a channel with an air inlet port defined between the first sheet and the second sheet and a first air outlet port formed in the first sheet, and a second air outlet port disposed away from the first air outlet port;
the first air outlet port and the second air outlet port are disposed in the airbag and opens to allow gas to flow into the airbag along two opposite directions perpendicular to a length direction of the channel;
the air inlet port is disposed out of the airbag.

17. A cushion airbag pad, comprising:
a plurality of airbags;
a plurality of surrounding portions, wherein the plurality of airbags is surrounded by the plurality of surrounding portions; and
a plurality of airways in the plurality of the surrounding portions and connecting with the plurality of airbags, wherein each airway is in air communication with two adjacent airbags of the plurality of airbags;
an air admittance member including a first sheet and a second sheet overlapped to the first sheet, wherein the first sheet and the second sheet are received in an airbag of the plurality of airbags; and the air admittance member is fastened to the plurality of surrounding portions at two opposite ends of the air admittance member, and each of the two opposite ends of the air admittance member passes through the airbag;
the first sheet and the second sheet cooperatively define a channel with an air inlet port defined between the first sheet and the second sheet and a first air outlet port formed in the first sheet;
the first air outlet port is disposed in the airbag and opens to allow gas to flow upward into the airbag;
the air inlet port is disposed out of the airbag;
a second air outlet port is disposed in airbag and overlaps the first air outlet port, the gas is allowed to flow into airbag along a direction perpendicular to a length direction of the channel;
a joint configuration is formed in the channel at which the first sheet is coupled to the second sheet;
the joint configuration is located at a same area where the first air outlet port and the second air outlet port are located; and
the joint configuration is divided into a plurality of parts by the first air outlet port and the second air outlet port.

* * * * *